(12) United States Patent
Davidge et al.

(10) Patent No.: US 9,521,174 B2
(45) Date of Patent: Dec. 13, 2016

(54) VIDEO SCRIPT INTERPRETER PLATFORM WITH COOPERATING CLIENT AND SERVER

(75) Inventors: Paul Matthew Davidge, New York, NY (US); Albert Lepinski, Clifton, NJ (US)

(73) Assignee: Paul Matthew Davidge, New York, NY (US)

( * ) Notice: Subject to any disclaimer, the term of this patent is extended or adjusted under 35 U.S.C. 154(b) by 1151 days.

(21) Appl. No.: 12/907,941

(22) Filed: Oct. 19, 2010

(65) Prior Publication Data
US 2012/0096092 A1   Apr. 19, 2012

(51) Int. Cl.
| | |
|---|---|
| G06F 15/16 | (2006.01) |
| H04L 29/06 | (2006.01) |
| G06F 21/34 | (2013.01) |
| G06F 21/35 | (2013.01) |
| H04L 29/08 | (2006.01) |

(52) U.S. Cl.
CPC ........... *H04L 65/4084* (2013.01); *G06F 21/34* (2013.01); *G06F 21/35* (2013.01); *H04L 67/02* (2013.01); *H04L 67/14* (2013.01)

(58) Field of Classification Search
CPC ...... G06F 21/34; G06F 21/35; H04L 65/4084; H04L 67/14; H04L 67/02
USPC ........................................................ 709/206
See application file for complete search history.

(56) References Cited

U.S. PATENT DOCUMENTS

| | | | |
|---|---|---|---|
| 7,477,890 B1 * | 1/2009 | Narayanaswami | H04L 67/42 455/414.1 |
| 7,650,010 B2 | 1/2010 | Levy | |
| 8,256,664 B1 * | 9/2012 | Balfanz | H04L 63/08 235/375 |
| 8,381,269 B2 * | 2/2013 | Yue et al. | 726/4 |
| 2002/0032730 A1 * | 3/2002 | Amit | G06Q 30/02 709/204 |

(Continued)

FOREIGN PATENT DOCUMENTS

| | | | | |
|---|---|---|---|---|
| GR | EP 2164242 A1 * | 3/2010 | | H04N 5/00 |

OTHER PUBLICATIONS

Gonzalez, Long polling in Node.js, May 21, 2010, http://blog.nemikor.com/2010/05/21/long-polling-in-nodejs/.*

(Continued)

*Primary Examiner* — James Conaway
(74) *Attorney, Agent, or Firm* — Brenda Pomerance

(57) ABSTRACT

A first device, such as a PC, is enabled to receive messages from a second device, such as an application server, that does not know the address of the first device, by interaction with an intermediate man-in-the-middle (MITM) server. The first device obtains an ID, provides the ID to a human using the first device, and then the human provides the ID to the second device. The second device sends a message to the MITM server addressed to the ID. Meanwhile, the first device long polls the MITM server, and in response to one of the long polls, the MITM server sends the message from the second device to the first device. The first device is operating according to a script that was received from an external device, in response to a request for the script from the first device. The request for the script is embedded in a web page that the first device received; the script request may be launched automatically by the web page or in response to an action by the human. The human perceives an interaction experience co-ordinated across devices.

20 Claims, 15 Drawing Sheets

(56) References Cited

U.S. PATENT DOCUMENTS

| | | | |
|---|---|---|---|
| 2004/0230410 A1 | 11/2004 | Harless | |
| 2005/0138576 A1* | 6/2005 | Baumert | G06F 21/35 715/862 |
| 2005/0149481 A1* | 7/2005 | Hesselink et al. | 707/1 |
| 2006/0252533 A1 | 11/2006 | Sakaguchi | |
| 2007/0274503 A1* | 11/2007 | Klemm et al. | 379/265.01 |
| 2008/0037452 A1* | 2/2008 | Tunmer et al. | 370/310 |
| 2008/0276183 A1* | 11/2008 | Siegrist | G06F 9/45512 715/748 |
| 2010/0005394 A1 | 1/2010 | Dubnov | |
| 2010/0070759 A1* | 3/2010 | Leon Cobos et al. | 713/155 |
| 2010/0107092 A1* | 4/2010 | Kindberg | G06F 17/30879 715/760 |
| 2010/0223071 A1* | 9/2010 | Kland et al. | 705/3 |
| 2010/0322404 A1* | 12/2010 | Coleman | H04M 3/42068 379/220.01 |
| 2011/0010643 A1* | 1/2011 | Lee | H04M 1/72561 715/760 |
| 2012/0036208 A1* | 2/2012 | Beisel | 709/206 |
| 2012/0243531 A1* | 9/2012 | Meer | H04M 3/5183 370/352 |
| 2013/0191902 A1* | 7/2013 | Friedl | H04L 9/3271 726/7 |
| 2013/0298197 A1* | 11/2013 | Baliga | G06F 21/34 726/4 |

OTHER PUBLICATIONS

Interactive XML version 1.1, 71 pages, Oct. 5, 2010.
Meteor, "An HTTP server for the 2.0 web", 2 pages, Jul. 8, 2010.
Meteor, "Interaction modes", 2 pages, Jul. 8, 2010.

\* cited by examiner

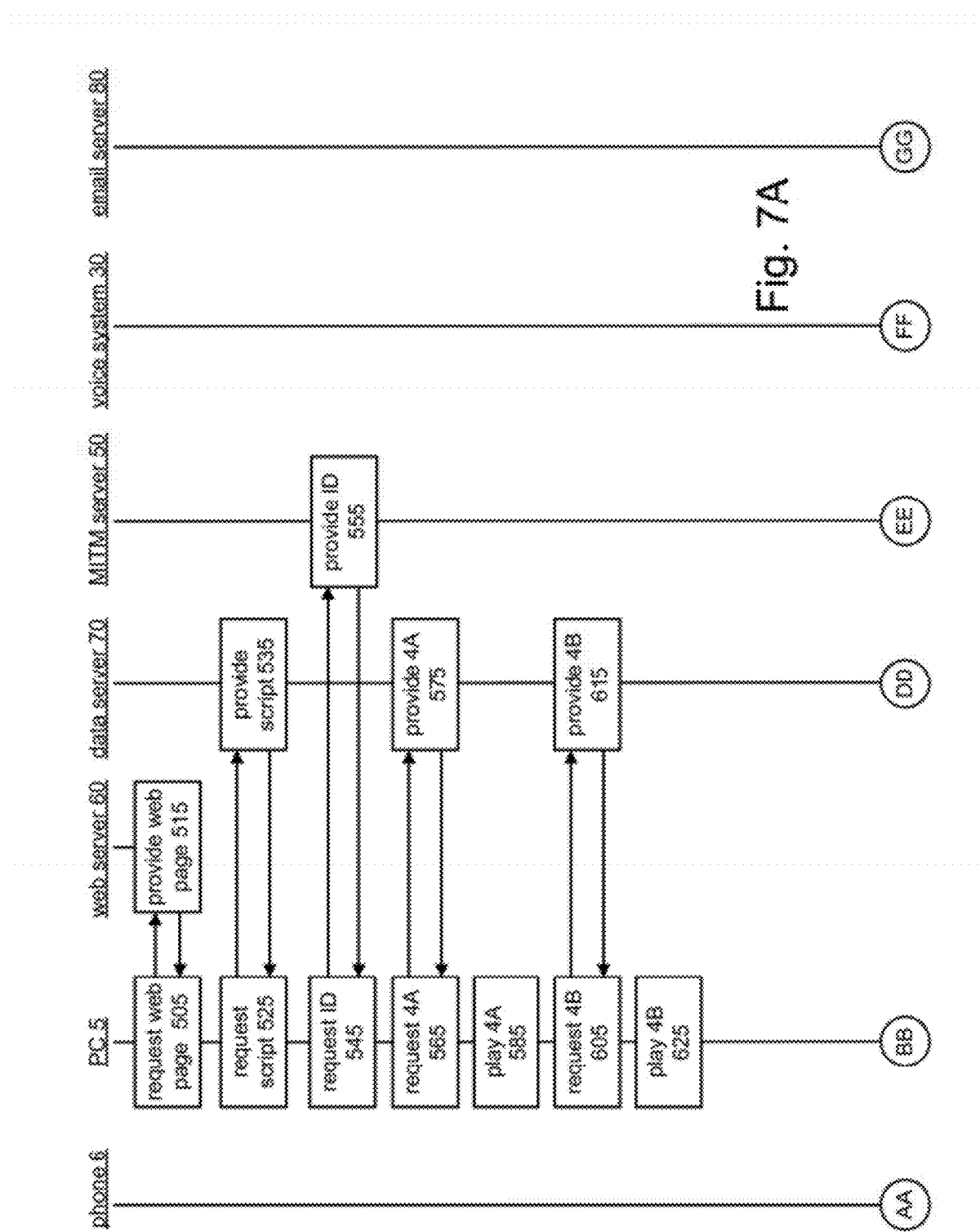

VIDEO SCRIPT INTERPRETER PLATFORM WITH COOPERATING CLIENT AND SERVER

BACKGROUND OF THE INVENTION

The present invention relates to enabling a computer to provide a multimedia experience to a user that spans various devices, and more particularly, is directed to a server computer programmed to receive and forward messages to a personal computer having a data communication network address unknown to resource providers.

Parties wishing to offer information and/or services and/or products to users, such as consumers, are using the Internet in increasing numbers. Typically, the offeror creates a web site and enables users to interact with the content at the web site via a conventional hypertext transfer protocol.

Various platforms exist for enhancing web page content, such as Sun Microsystems JAVA, Microsoft Silverlight and Adobe Flash.

Adobe Flash (formerly Macromedia Flash) is a multimedia platform used to add animation, video, and interactivity to Web pages. Flash is frequently used for advertisements and games. More recently, it has been positioned as a tool for Rich Internet Applications. To this end, Adobe released Adobe Integrated Runtime (AIR), a cross-platform runtime environment which can be used to build, using Adobe Flash, rich Internet applications that can be deployed as desktop applications. AIR is installed silently when Acrobat Reader is installed.

Flash manipulates vector and raster graphics to provide animation of text, drawings, and still images. It supports bidirectional streaming of audio and video, and it can capture user input via mouse, keyboard, microphone, and camera. Flash contains an Object-oriented language called ActionScript, discussed below. The use of vector graphics combined with program code allows Flash files to be smaller—and thus for streams to use less bandwidth—than the corresponding bitmaps or video clips. In addition to a vector-rendering engine, the Flash Player includes a virtual machine called the ActionScript Virtual Machine (AVM) for scripting interactivity at run-time, support for video, MP3-based audio, and bitmap graphics. Flash Player is a browser plugin, and cannot run within a usual e-mail client, such as Outlook. Instead, a link must open a browser window. A Gmail labs feature allows playback of YouTube videos linked in mails.

Flash content may be displayed on various computer systems and devices, using Adobe Flash Player, which is available free of charge for common Web browsers, some mobile phones, smart phones and a few other electronic devices (using Flash Lite).

Flash script instruction files are in the ShockWave Flash (.swf) format, are used for content such as Flash games, may include media, such as .mp4 or .mov or .flv files, and may be used in the form of a Web-page plug-in, strictly "played" in a standalone Flash Player, or incorporated into a self-executing Projector movie (with the .exe extension in Microsoft Windows). Flash Video files have a .flv file extension and are either used from within .swf files or played through a fly-aware player, such as VLC, or QuickTime and Windows Media Player with external codecs added ActionScript is a scripting language developed by Adobe. It has the same syntax and semantics as the more widely known JavaScript, and is used primarily for the development of websites and software targetting the Adobe Flash Player platform, used on Web pages in the form of embedded SWF files. ActionScript was initially designed for controlling simple 2D vector animations made in Adobe Flash. Initially focused on animation, early versions of Flash content offered few interactivity features and thus had very limited scripting capability. Later versions added functionality allowing for the creation of Web-based games and rich Internet applications with streaming media (such as video and audio). Flash MX 2004 introduced ActionScript 2.0, a scripting programming language more suited to the development of Flash applications. It is often possible to save time by scripting something rather than animating it, which usually also enables a higher level of flexibility when editing. ActionScript 3.0 is an object oriented programming language allowing far more control and code reusability when building complex Flash applications. This version of the language is intended to be compiled and run on a version of the ActionScript Virtual Machine.

Flash libraries can be used with the XML capabilities of the browser to render rich content in the browser. This technology is known as Asynchronous Flash and XML, much like AJAX.

Systems providing a multimedia experience to a user are discussed below.

U.S. Pat. No. 7,650,010 (Levy) explains that a linked object is created by associating an identifier for a media object (video, audio, graphic) with metadata (col. 2, lines 55-56). A decoding process in a media player extracts the identifier from the object and uses it to retrieve related data (col. 2, lines 63-65). The related data enables actions such as purchases or transferring content (streaming or downloading) from a main server (column 3, lines 3-5), or redirecting to another server (col. 4, lines 63-67). The other server returns data via the main server (col. 5, lines 37-40) linked via the identifier (col. 5, lines 51-52).

U.S. Patent Application Publication 2010/0005394 (Dubnov) shows a client-server system in which the client's display has a billboard area, and the server pushes information to the billboard area [0024]. The information is pushed in accordance with a scripted timeline [0025]. The server stores all the information that is to be pushed to the viewer [0040].

U.S. Patent Application Publication 2004/0230410 (Harless) shows a unitary system that executes a script. In response to client utterances, different information is displayed according to the script. Each video clip starts and ends in a "neutral" position to minimize discontinuity when segueing from clip to clip.

U.S. Patent Application Publication 2006/0252533 (Sakaguchi) shows, in FIGS. 3-4, communication network 302 that connects key distribution center 306, online services 304(1) . . . 304(s), game units 100(1) . . . 100(g), and data center 410. Game units can communicate with online services or with the data center. Via the data center, game units can communicate data with other game units. Notification server 418 at data center 410 maintains queues of messages for logged-in gamers [0061]. The game embodies a story. Each game unit has at least two frames in its display, for synchronized interactive and non-interactive videos relating to the story [0077-0092].

However, a party wishing to offer a multi-media experience to a user without requiring that the user download special client software, cannot easily provide such an experience.

SUMMARY OF THE INVENTION

In accordance with an aspect of this invention, there is provided a method of enabling a second device to communicate with a first device, comprising receiving an ID and a network address from the first device, and placing the ID on a waiting list, the ID being associated with the network address. Next, a message addressed to the ID is received from the second device, the ID having been provided to the second device by direct human activity. The message is sent to the network address associated with the ID on the waiting list.

In accordance with another aspect of this invention, there is provided a method of enabling a second device to communicate with a first device, comprising receiving a request for an ID from the first device, generating the ID, storing the ID in association with a network address of the first device, sending the ID to the first device and receiving, from the second device, a message addressed to the ID, the ID having been provided to the second device by direct human activity. The message is sent to the network address associated with the ID.

In accordance with a further aspect of this invention, there is provided a method of enabling a second device to communicate with a first device, comprising providing to a human, from the first device, an ID associated with the first device, sending a poll from the first device to an MITM server, and receiving, at the first device from the MITM server, a message from the second device. The message was provided to the MITM server from the second device and included an address to the ID, and the ID was provided to the second device by direct human activity.

In accordance with yet another aspect of this invention, there is provided a method of enabling a second device to communicate with a first device, comprising receiving, at the second device, an ID, the ID being provided by direct human activity, generating, at the second device, a message for the first device that is addressed to the ID, and sending, from the second device, the message to an MITM server. The MITM server receives a poll from the first device including the ID, and sends the message from the second device in response to the poll.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 7A-7D are a flowchart showing operation of the first use case;

DETAILED DESCRIPTION

The present invention enables a script author to easily define a multi-media experience for a user spanning multiple interaction points, without requiring that special client software be downloaded to the user's device.

A first device, such as a PC, is enabled to receive messages from a second device, such as an application server, that does not know the address of the first device, by interaction with an intermediate man-in-the-middle (MITM) server. The first device obtains an ID, provides the ID to a human using the first device, and then the human provides the ID to the second device.

Providing the ID from the first device to the human may occur visually (displayed on a screen that is visible to a human), in tangible form (printed on a paper or bar code printer coupled to the first device), audibly (via speech synthesis or pre-recorded speech played by the first device), or by other appropriate techniques.

Providing the ID from the human to the second device may occur via typing on a keyboard or keypad, touching areas of a touch screen, speaking to a voice recognition program, showing a tangible item (such as a printed paper or bar code or electromagnetic card or memory stick) to a reader or scanner, standing in a particular place, or any other activity that requires direct action by the human, that is, not by a software program acting in place of the human.

The second device sends a message to the MITM server addressed to the ID. Meanwhile, the first device long polls the MITM server, and in response to one of the long polls, the MITM server sends the message from the second device to the first device. The first device is operating according to a script that was received from an external device, in response to a request for the script from the first device. The request for the script is embedded in a web page that the first device received. The human perceives an interaction experience co-ordinated across devices.

An advantage of this technique is that nothing needs to be downloaded by the user to their computer, that is, there is no special "client" software assumed to reside in the user's computer.

This technique enables a user's experiences across different devices to be integrated by the provider of the experiences.

Figure 1:
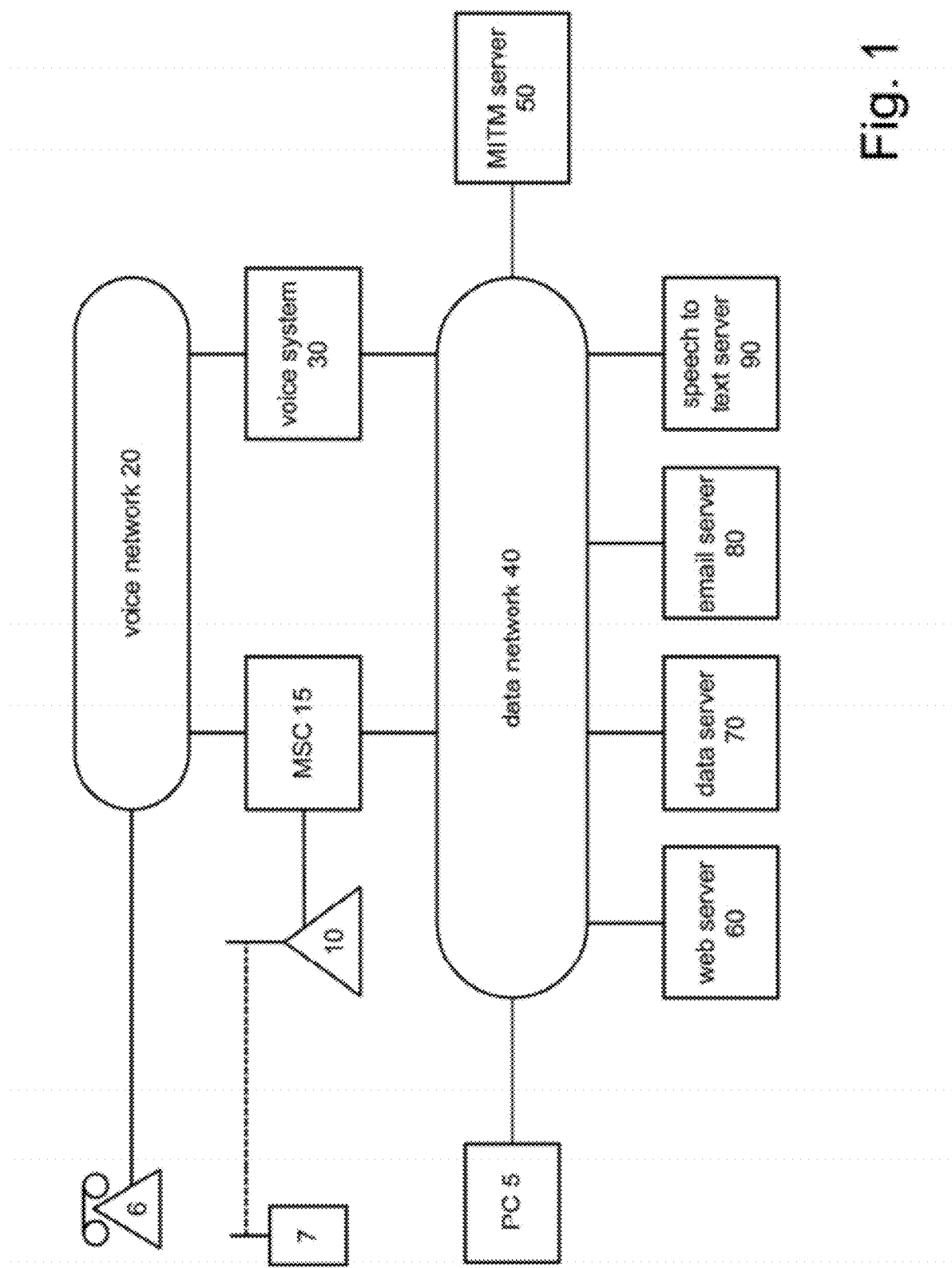
FIG. 1 is a block diagram showing a configuration in which the present invention is employed.

FIG. 1 is a block diagram showing a configuration in which the present invention is employed. FIG. 1 shows personal computer (PC) 5, telephone 6, mobile communication device 7, antenna 10, mobile switching center (MSC) 15, voice network 20, voice system 30, data network 40, man in the middle (MITM) server 50, web server 60, data server 70, email server 80 and speech to text server 90.

An end-user, such as a consumer, uses one or more of PC 5, telephone 6 and mobile communication device 7.

PC 5 is a general purpose computer having a processor, memory, storage, display, keyboard, communication interfaces for at least one of wireline and wireless communication with data network 40, and other conventional hardware. PC 5 executes software including an operating system, such as Microsoft Windows or Apple Mac OS or Linux; a browser, such as Microsoft Internet Explorer, Apple Safari, Opera, Google Chrome or Mozilla Firefox; and a script interpreter, such as Adobe Flash Player, Microsoft Silverlight or Sun JAVA.

The script interpreter executing in PC 5 has the ability to write a so-called cookie to the memory of PC 5, to preserve intra-session and inter-session variable values for the script. In some embodiments, the script interpreter is able to write information to, and read information from, a database stored in storage associated with PC 5. In some embodiments, a server cooperates with the script interpreter so that the variable values are stored at the server, instead of at PC 5.

Telephone 6 is a plain old telephone having a wireline connection to voice network 20.

Mobile communication device 7 is adapted to communicate wirelessly with antenna 10. In the configuration shown, antenna 10 is a cellular antenna operating with MSC 15. In these configurations, mobile device 7 is usable for one or more of analog voice communication, digital voice communication and digital data communication. In other configurations, antenna 10 is a WiFi antenna coupled to data network 40, and device 7 is not usable for analog voice communication. Mobile device 7 has a general purpose computer including a processor, memory, storage; a display, a keyboard or touch screen, and appropriate communication interfaces.

MSC 15 is adapted to communicate with device 7, and to forward the communication to one or more of voice network 20 and data network 40.

Voice network 20 is adapted for analog voice communication and operates in a circuit switched manner. An example of voice network 20 is the plain old telephone service (POTS) network established by ATT. Voice network 20 communicates with telephone 6, MSC 15 and voice system 30.

Data network 40 is adapted for digital data communication and operates in a packet switched manner. An example of data network 40 is the Internet. Data network 40 communicates with PC 5, MSC 15, voice system 30, MITM server 50, web server 60, data server 70, email server 80 and speech to text server 90.

Each of voice system 30, MITM server 50, web server 60, data server 70, email server 80 and speech to text server 90, is a general purpose computer or system of computers programmed to operate according to the present invention, including at least one processor, communication interfaces, memory, storage and other hardware and software as needed.

Voice system 30 is operative to receiving an incoming circuit switched voice call, to perform speech to text conversion, and to provide audible menus and information to the caller in response to a session script that controls voice system 30.

MITM server 50 is a facility that provides unique IDs and then is able to forward messages to an actual address associated with the unique IDs. Thus, the author of the script can coordinate information transmission using only the unique ID. Furthermore, as explained below, MITM server 50 uses a long poll technique that allows information to be sent to PC 5 even when it has not directly requested the information. Other entities communicating with MITM server 50, such as voice system 30, may also use the long poll technique.

In some embodiments, instead of MITM server 50 providing unique IDs, another server, such as web server 60 or data server 70, provide the unique IDs. In this context, unique means unique relative to all other IDs maintained by PC 5 and unique relative to all other devices that MITM server 50 can communicate with.

In some embodiments, IDs are never re-used.

Web server 60 is operative to respond to requests for web pages by providing web pages to the requestor. A web page may include links such as to a .pdf data file stored at web server 60, or a JAVA applet to be downloaded to PC 5, a multimedia data file, or a client script to be downloaded to PC 5.

Data server 70 is operative to respond to a request for a data file by providing the requested data file. A data file may be a .pdf data file, a JAVA applet, a multimedia data file, or a client script.

In some embodiments, data server 70 includes a database of pairs of ID/address values. When a user has an addressable device (e.g., telephone number, email address, IM address), as opposed to a web browser that cannot be directly addressed, after the ID for the user's address is registered in the database, information can be sent directly to the addressable device. If the device is a web browser (HTTP client), then MITM server 50 and long polling are required to communicate with the device.

Email server 80 is operative to respond to an incoming email by preparing a responsive email and sending the responsive email to the source of the incoming email. The responsive email can include data such as a coupon, an award, an activity confirmation, a data file, a hyperlink to a server, and so on.

Speech to text server 90 is operative to receive a file representing a speech signal, and to convert the speech signal to alphanumeric text corresponding to the utterances in the speech. Speech to text server 90 then sends the text file to the destination specified with the file containing the speech signal, or if there is no specified destination, simply returns the text file to the originator of the file containing the speech signal. Server 90 executes a program such as LumenVox Speech Engine, available at www.lumenvox.com, that converts a spoken audio file to a text file.

In other embodiments, the functions described above may be distributed differently. For example, speech to text server 90 may execute on the computer(s) used for MITM server 50. As another example, email server 80 may execute on the computer(s) used for web server 60.

In other embodiments, other servers providing other functions are additionally present.

In a multimedia service according to the present invention, PC 5 requests a web page from a server. The server responds with a web page including a link to a client script. The client script may be located on the same or a different server. When the user of PC 5 clicks on the link to the client script, the browser in PC 5 automatically sends a request for the client script to the address in the link on the web page. In some embodiments, instead of the user clicking on a link, the web page automatically requests the client script from an address embedded in the web page. When PC 5 receives the client script, its script execution software, such as Flash player, immediately begins executing the script.

The client script is written using a script language. The author of the client script is responsible for ensuring that any servers that are to provide information according to the client script are appropriately programmed to coordinate with the client script. A client script is executed by PC 5, while a session script is executed by voice system 30. The use case discussed below illustrates how execution of a client script is coordinated with execution of a session script.

Short polling, long polling and streaming, three techniques for communicating information from a server to a client such as PC 5, are now briefly discussed.

In short polling, the client connects to the server and requests new events. The server sends an immediate response containing the events that have occurred since the client last requested an update, and closes the connection. The client waits a predetermined interval and initiates another request. Using this method, client and server spent the majority of their time not connected to each other, with the regular periodic short polling connections being answered and closed by the server within a few milliseconds. This reduces the number of concurrent connections required of the server, but if there are many subscribers and the updates being requested by each one require a resource-intensive backend operation (like a database query), the server can rapidly become overloaded doing unnecessary tasks over and over again. Short polling is the most reliable way of updating data that will generally survive most browser and connection setups, but it is not particularly scalable and the client is by no means receiving updates as they happen, rather, the client receives updates only in response to a request.

In long polling, the client initiates a request, and if the server has events pending, it sends them and closes the connection, much like short polling. But if the server does not have any events waiting, it holds the connection open until an event occurs, at which point it sends the event and closes the connection. The client can then initiate a new connection immediately, since all the waiting is done at the server end. The server automatically closes the connection after a very long predetermined time, such as 30 seconds which is very long relative to computer processing times. The obvious benefit to this is that the client can treat the interaction as a simple 'request-response' and wait for it to complete before processing it rather than having to sniff the response as it loads. It works through proxies and is more resilient to connections dropping. And since the server is actively closing connections all the time, the chance of long-lived zombie connections is much reduced. On the negative side, there is a need to create and close many more connections than for a stream, one for each event that is sent but far fewer than for short polling, because the server no longer has the thankless task of responding to millions of repeated requests with "no updated events available". Also events may be slightly delayed if they occur in rapid succession while the client is reinitiating a new connection after the last update.

In streaming, a client initiates a request, and the server immediately responds and continues indefinitely until the client closes the connection. This would seem to be the ideal method of interaction—events can be pushed out as they happen on a pre-established connection, the resources spent opening and closing sockets are minimized, and since the connection has already been negotiated, no additional headers or wrapper content are required so the use of bandwidth is also very efficient. The problems with streaming are evident when the connection is routed to, or via, hosts that are not willing to play ball with this style of interaction. First, web browsers may wait for the entire response to complete before processing it. Second, proxy servers may wait for a response to complete before passing it on to the client, so streaming connections may never get received. On the server side there are issues as well. By having no timeout on connections, it is possible for many zombie connections to slowly build up, particularly if the client has failed to disconnect but is no longer listening for the response. This is particularly the case with proxy caches that try to finish downloading files even when their client has disconnected, so that the file is cached for the next request. And even assuming no zombie connections, there is still the issue of concurrency—thousands of open sockets with not very much happening on most of them at any given moment.

Meteor, described at http://meteorserver.org, is a server protocol that supports multiple methods of pushing data over HTTP: streaming, short polling and long polling. Subscribers are clients that connect to a Meteor server and request a subscription to a particular channel. Event controllers are clients that provide events to Meteor for a particular channel. Meteor sends the events provided by the event controllers to the channel subscribers. Importantly, however, Meteor subscribers and event controllers do not communicate with each other. Additionally, Meteor is concerned with coordinating events on the Internet via communication channels, whereas the present invention is concerned with coordinating an Internet event with a non-Internet event.

FIG. 2 is a flowchart showing operation of MITM server 50.

MITM server 50 is capable of executing multiple concurrent processing threads. Steps 102-122 represent processing for communicating with devices such as PC 5. Steps 130-132 represent processing for communicating with other servers that are setting up a channel to MITM server 50. Steps 140-152 represent receiving messages that are to be forwarded, such as from an external server to a device, from an external server to another external server, or from a device to an external server.

It is useful for a server or device that can communicate with another server to route messages through MITM server 50 for audit trail purposes, and to shield a script author that wrote scripts executing at the server or device from the communication details of opening and closing channels.

At step 102, MITM server 50 receives a request for a unique identifier (ID), such as a string of alphanumeric digits, or numeric digits. It is assumed that data network 40 automatically provides the data network address of the requestor; however, this data network address is not necessarily a permanent address. For example, PC 5 may be the requestor; when PC 5 uses an Internet service provider employing a server farm, the data network address is the Internet Protocol (IP) address for PC 5, and could be any one of the data network addresses for the server farm. By contrast, an instance of a fixed address is when device 7 is the requestor; its data network address is the data network address of MSC 15.

At step 104, MITM server 50 generates a unique identifier, such as by incrementing a last-assigned unique identifier, or by choosing from a pool of unique identifiers, or other suitable technique, then stores the unique ID with the data network address of the requestor. MITM server 50 also establishes an audit trail for this ID.

At step 106, MITM server 50 sends the unique ID to the requestor. More specifically, MITM server 50 prepares a message addressed to the requestor of the unique ID, including the unique ID in the message body. In some embodiments, a confirmation code accompanies the unique ID.

At step 108, MITM server 50 receives a message indicating that a device, such as PC 5, is waiting for a message from MITM server 50 to the unique ID. This is the start of a long poll sequence; the long poll sequence encompasses steps 108-118.

At step 109, MITM server 50 checks whether the unique ID is already on the waiting list (discussed below). If so, processing skips to step 113. If not, processing continues at step 110.

At step 110, MITM server 50 determines whether the device is authorized.

In one embodiment, MITM server 50 simply assumes that the device is authorized; this is plainly a non-secure embodiment.

In another embodiment, MITM server 50 compares the data network address of the device with the data network address associated with the unique ID; if they match, then MITM server 50 determines that the device is authorized to receive messages for that unique ID. It will be appreciated that this embodiment works properly when the device associated with the unique ID, also referred to as the genuine device, has a static data network address. However, if the genuine device has a dynamic data network address, then this embodiment may deny service to the genuine device.

In a further embodiment, assuming that MITM server 50 sent a confirmation code at step 106, then at step 110, MITM server 50 checks whether the confirmation code provided by the device matches the confirmation code associated with the unique ID; if they match, then MITM server 50 determines that the device is authorized to receive messages for that unique ID. In the variation shown in FIG. 2, the confirmation code is checked only when the device is placed on the waiting list (discussed below). In another variation, the confirmation code is checked each time the device initiates a long poll.

If MITM server 50 determines that the device is not authorized, processing returns to step 108.

At step 112, MITM server 50 has determined that the device is authorized, and so its unique ID is added to a "waiting list", that is, a list of devices waiting for messages from MITM server 50 along with the current data network address for the device. In some embodiments, MITM server 50 also writes an audit trail record showing the device being added to the waiting list. At this point, information can be pushed from data network 40 to the device, even if the device uses a request/response protocol. Furthermore, the information can be pushed to the device by a third party that knows only the unique ID for the device. In other words, MITM server 50 eliminates the need for a third party to know the data network (actual physical) address of the device, as long as the third party knows the unique ID of the device and the data network address of MITM server 50.

The Internet, an instance of data network 40, assumes PC 5 operates according to hypertext transfer protocol (HTTP), in which PC 5 sends a request to a server, and the server responds with information. With HTTP, a server cannot send unsolicited information to PC 5.

In other embodiments, data network 40 operates according to a protocol other than HTTP.

At step 113, MITM server 50 sets a first maximum timer $T_{MAX}$ for a predetermined time, such as fifteen minutes, indicating the maximum time that a device can remain on the waiting list with no activity. Also at step 113, MITM server 50 sets a second long poll timer $T_{POLL}$ for the duration of the long poll, such as thirty seconds.

At step 114, MITM server 50 checks whether there are any messages waiting for the unique ID. If so, MITM server 50 sends the message to the device associated with the unique ID on the waiting list. After sending, or if there were no waiting messages, processing continues at step 116.

Figure 2A:
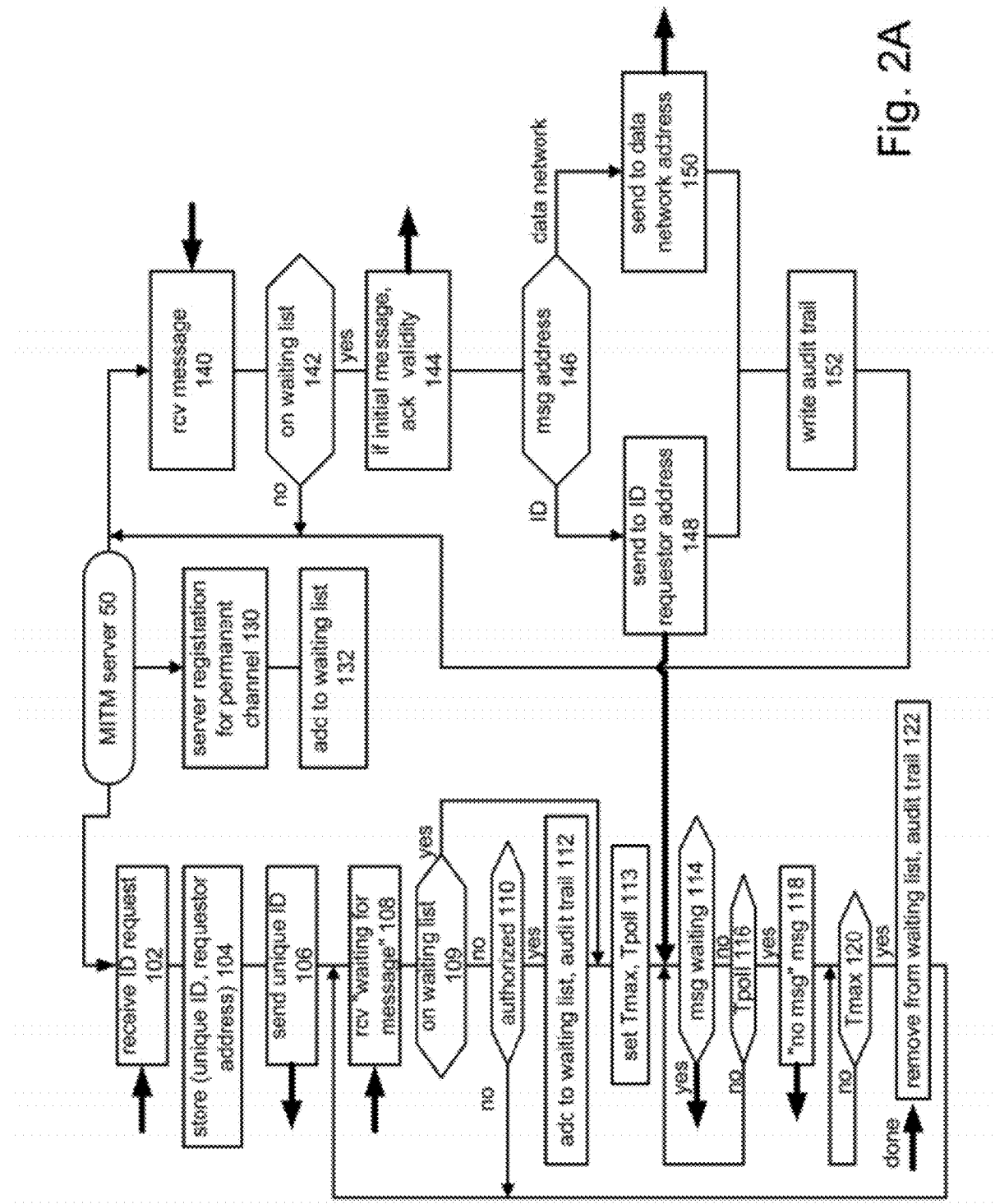
FIG. 2A is a flowchart showing operation of MITM server 50.

The long polling technique shown in FIG. 2A differs slightly from a conventional long polling technique.

Figure 2C:
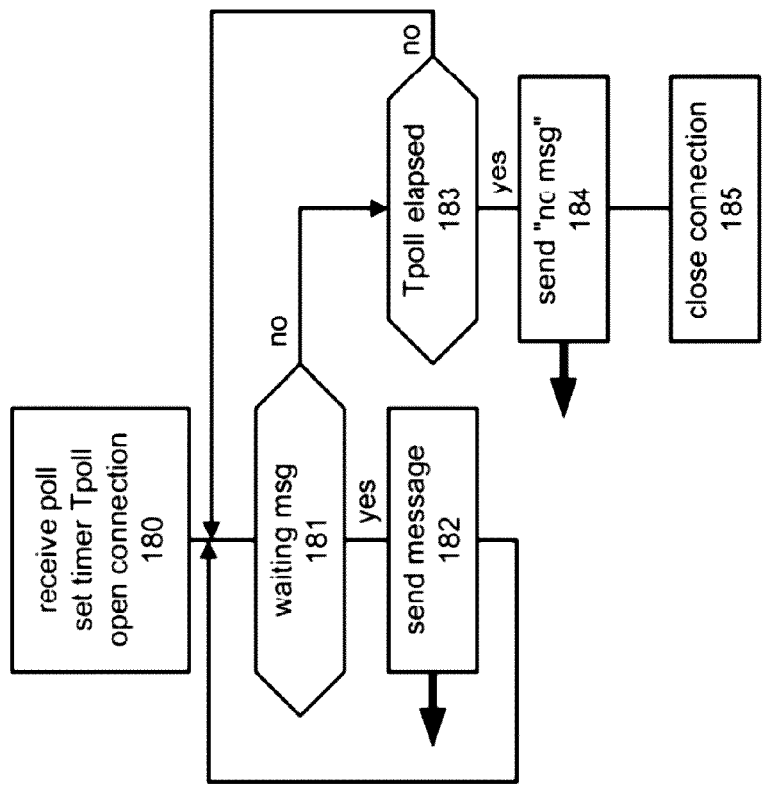
FIGS. 2B-2C are flowcharts showing two polling techniques.
Figure 2B:
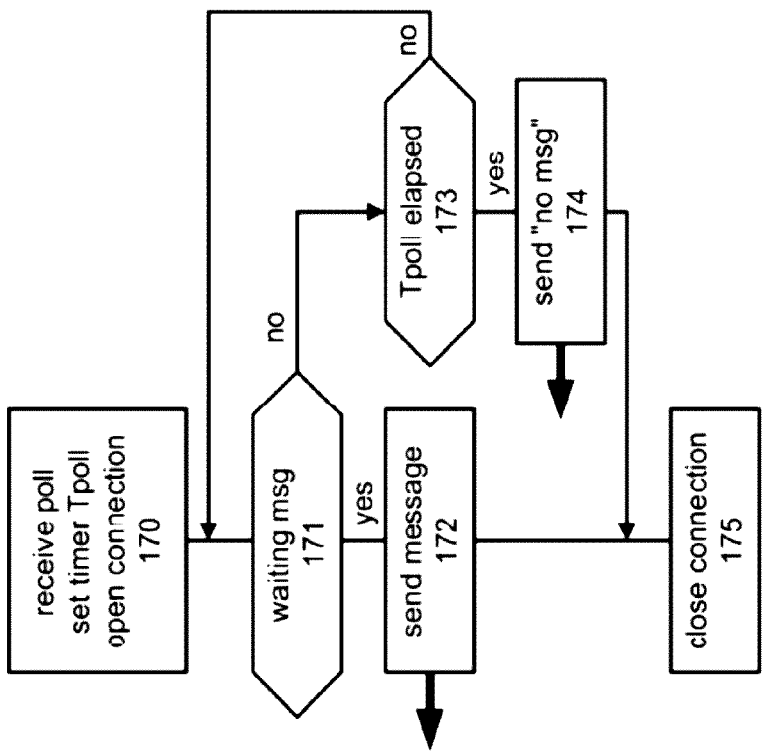

FIG. 2B shows a conventional long polling technique. At step 170, a long poll is received by MITM server 50, and MITM server 50 sets the timer $T_{POLL}$ and opens a connection to the device. At step 171, MITM server 50 checks whether there is a message waiting to be sent to the device, either because the message just arrived or because it is a message that arrived in the interpoll time between the end of the previous long poll and the start of the current long poll. If there is a waiting message, at step 172, MITM server 50 sends the message to the device associated with the unique ID, and at step 175, MITM server 50 closes the connection to the device. If there is no waiting message, then at step 173, MITM server 50 checks whether $T_{POLL}$ has elapsed; if not, processing returns to step 171; but if $T_{POLL}$ has elapsed, then at step 174, MITM server 50 sends a "no messages" message to the device, and processing continues at step 175.

FIG. 2C shows the long polling technique used in the present embodiment. Steps 180, 181, 183, 184, 185 correspond to steps 170, 171, 173, 174, 175; respectively. At step 182, after sending the waiting message to the device associated with the unique ID, MITM server 50 returns to step 181. That is, in the present long polling technique, MITM server 50 closes the connection to the device only when $T_{POLL}$ elapses, and this is indicated by the sending of a "no messages" message. Advantageously, a newly arriving message is not delayed because there was a waiting message.

In some embodiments, a conventional long polling technique is used.

Returning to FIG. 2A, at step 116, MITM server 50 checks whether the second poll timer $T_{POLL}$ has elapsed. If not, processing returns to step 114.

If $T_{POLL}$ has elapsed, at step 118, MITM server 50 generates a "no messages" message and sends the message to the device. (Upon receipt of the "no messages" message, the device should immediately send another long poll, which will be received at step 108 and at step 113, both timers $T_{MAX}$ and $T_{POLL}$ will restart.) However, after the end of one long poll but before the start of another long poll (the interpoll time), the device should remain on the waiting list, because a message may arrive in the interpoll time and/or the device may have a temporary connection problem. Processing continues at step 120.

At step 120, MITM server 50 checks whether the first maximum timer $T_{MAX}$ has elapsed. If not, this step repeats. The effect is that MITM server 50 simply waits until the end of the first maximum timer $T_{MAX}$ and stores any messages that arrive during this time.

If $T_{MAX}$ has elapsed, at step 122, MITM server 50 removes the unique ID from the waiting list. In some embodiments, MITM servers 50 writes an audit trail record the device being removed from the waiting list. Also, if the device itself sends a "done" message, MITM server 50 removes the unique ID from the waiting list. In some embodiments, the stored messages continue to be stored, and are delivered the next time that a long poll for the unique ID is received. In other embodiments, the messages are deleted when the unique ID is removed from the waiting list. Processing returns to step 108.

A third party server, such as email server 80, can send messages to MITM server 50 without previous registration.

However, to receive messages from MITM server 50, a third party server must be on the waiting list at MITM server 50.

There are two ways that a third party server can get onto the waiting list at MITM server 50. The first way is for the third party server to use a long poll technique, as described in steps 108-118. The second way is for the third party server to open a permanent connection, as described in steps 130-132.

At step 130, the third party server sends its name or names and data network address to MITM server 50. At step 132, MITM server 50 adds the third party server to its waiting list. More specifically, the third party server provides its data network address, such as an Internet protocol address and port number, enabling MITM server 50 to create a permanent socket connection. Generally, the third party server remains on the waiting list forever. There are administrative procedures (not shown) for removing the third party server when it ceases to receive messages from MITM server 50.

At step 140, MITM server 50 receives a message with a destination address. The message can be one of at least the following types:

a message from a third party server that has been programmed to use MITM server 50 to provide information to the device associated with the unique ID, as part of a multimedia experience;

a message from a third party server to another third party server; and/or a message from the holder of the unique ID to a third party server.

It is an important capability of MITM server 50 that it can receive messages from third party servers heretofore unknown to MITM server 50; as long as the third party server provides a valid unique ID, MITM server 50 can properly forward the message. This capability simplifies script writing for third party servers.

At step 142, MITM server 50 determines if the destination address is on the waiting list. If not, MITM server 50 sends an error message (not shown) to the sender of the message and processing returns to step 140. In some embodiments, an error message is written to an error log either in addition to, or in place of, sending the error message to the sender of the message.

If the destination address is on the waiting list, and is a unique ID, then at step 144, MITM server 50 checks whether this is the first time that the sender has tried to send a message to the unique ID, if so, MITM server 50 acknowledges that the unique ID is valid. In some embodiments, this step is omitted.

At step 146, MITM server 50 checks whether the destination address is a unique ID or is a data network address.

If the message is addressed to a unique ID, at step 148, MITM server 50 sends the message to the data network address associated with the unique ID. It will be appreciated that this feature enables third party servers to follow scripts for communicating with users, without maintaining address information for such users. This feature also enables third party servers to "push" information to users even when data network 40 operates according to a "pull" protocol, or the user is behind a firewall.

Figure 2D:
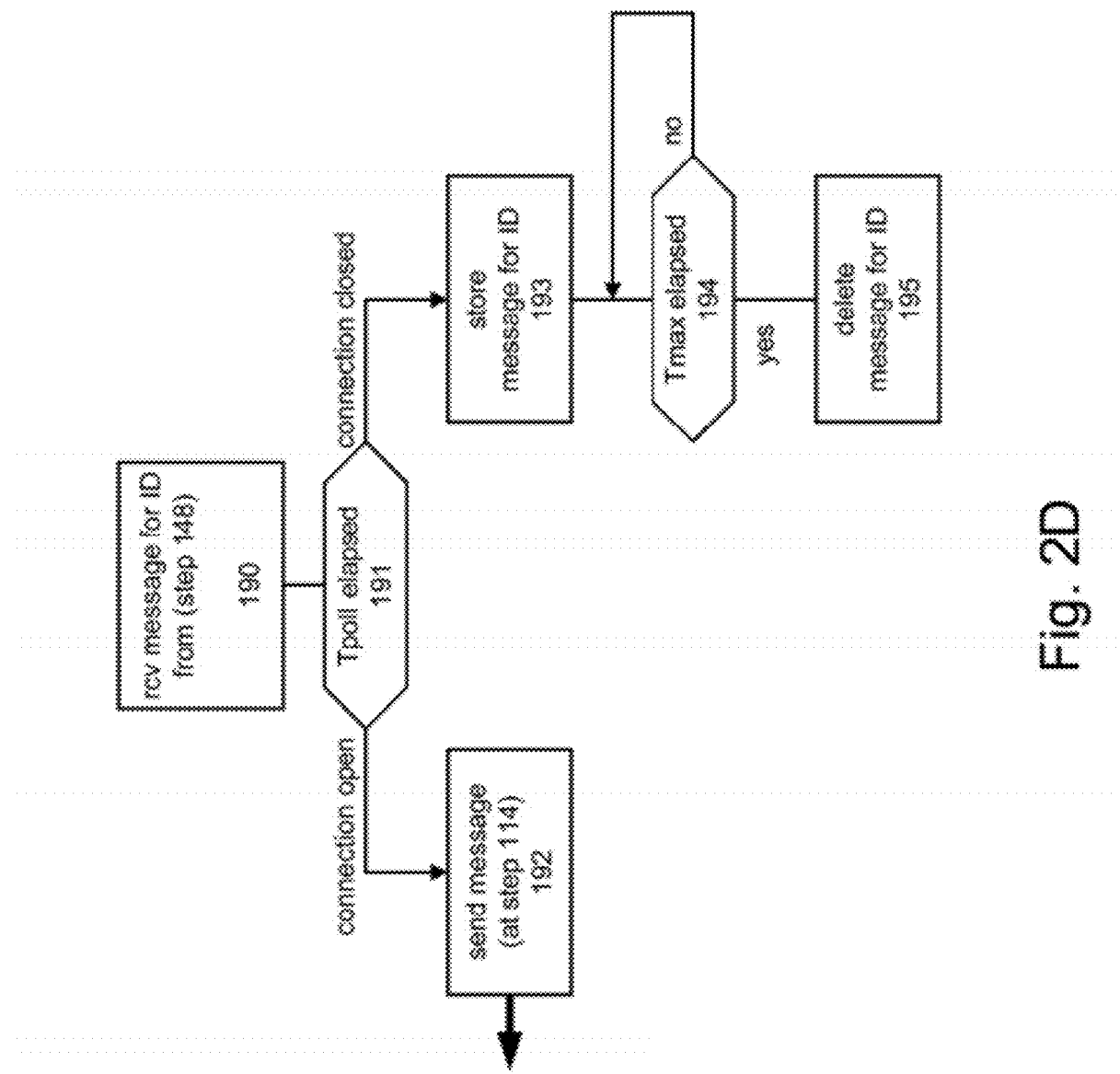
FIG. 2D is a flowchart showing a detail of FIG. 2A.

FIG. 2A shows a message being transferred from step 148 to step 114 for sending to a device associated with a unique ID used as the destination address in the message. FIG. 2D shows the details of this transfer. At step 190, the message is identified as ready for transfer from step 148 to step 114. At step 191, MITM server 50 examines the $T_{POLL}$ timer associated with the unique ID; because the unique ID is on the waiting list, it is likely that there is a device waiting for messages for the unique ID. If $T_{POLL}$ has not elapsed, this means the connection to the device is open, and so the message is transferred to step 114 and sent immediately. However, if $T_{POLL}$ has elapsed, then the connection to the device is closed, and so at step 193, MITM server 50 stores the message. Usually, another long poll will soon arrive from the device associated with the unique ID, and the stored message will be retrieved and sent to the device, and so the processing shown in FIG. 2D will end (not shown in FIG. 2D). However, in some cases, another long poll from the device will not arrive soon. At step 194, MITM server 50 checks whether the unique ID is still on the waiting list by examining $T_{MAX}$. If so, then processing returns to step 194. If the unique ID is not on the waiting list, then the message is deleted.

In contrast to the Meteor protocol described above, step 146 of FIG. 2 enables a third party server—an "event controller" in Meteor terminology—to send information to a specific user such as PC 5—corresponding to a "subscriber" in Meteor terminology. Hypothetically, Meteor could be used so that each channel has only one event controller and one subscriber, but this is awkward and burdens the author of the script executing in PC 5 with opening and closing channels. MITM server 50, by contrast with Meteor, enables the burden of communication administration to be substantially hidden from the script author.

At step 148, MITM server 50 examines the message content for an ID that is to be translated to a physical address, by looking for special characters in the message, such as the delimiters <address_ID> and </address_ID>. When MITM server 50 finds an address that is to be translated, it performs the translation by replacing the delimiters and unique ID with the address associated with the unique ID, where "data network address" was stored at step 104 or step 112.

If the message has a data network destination address, at step 150, MITM server 50 sends the message to the data network address in the message. By sending traffic for a session through MITM server 50, a better audit trail is created than if data from multiple servers has to be later merged, helping the script author to understand how users are actually using the scripts. Further, requiring that all traffic for a session go through MITM server 50 imposes discipline on scripts, useful in developing best practices for scripts.

At step 152, MITM server 50 writes an audit trail entry, and processing returns to step 140.

In some embodiments, unique IDs are assigned by a separate server, such as web server 60, and the separate server notifies MITM server 50 when new IDs have been assigned or released, so MITM server 50 can perform its message forwarding and audit trail generation functions as described above.

A first use case will now be described. For brevity, the use case involves small scripts. The scripts are somewhat contrived, as their purpose is to illustrate the functionality of MITM server 50.

Figure 3:
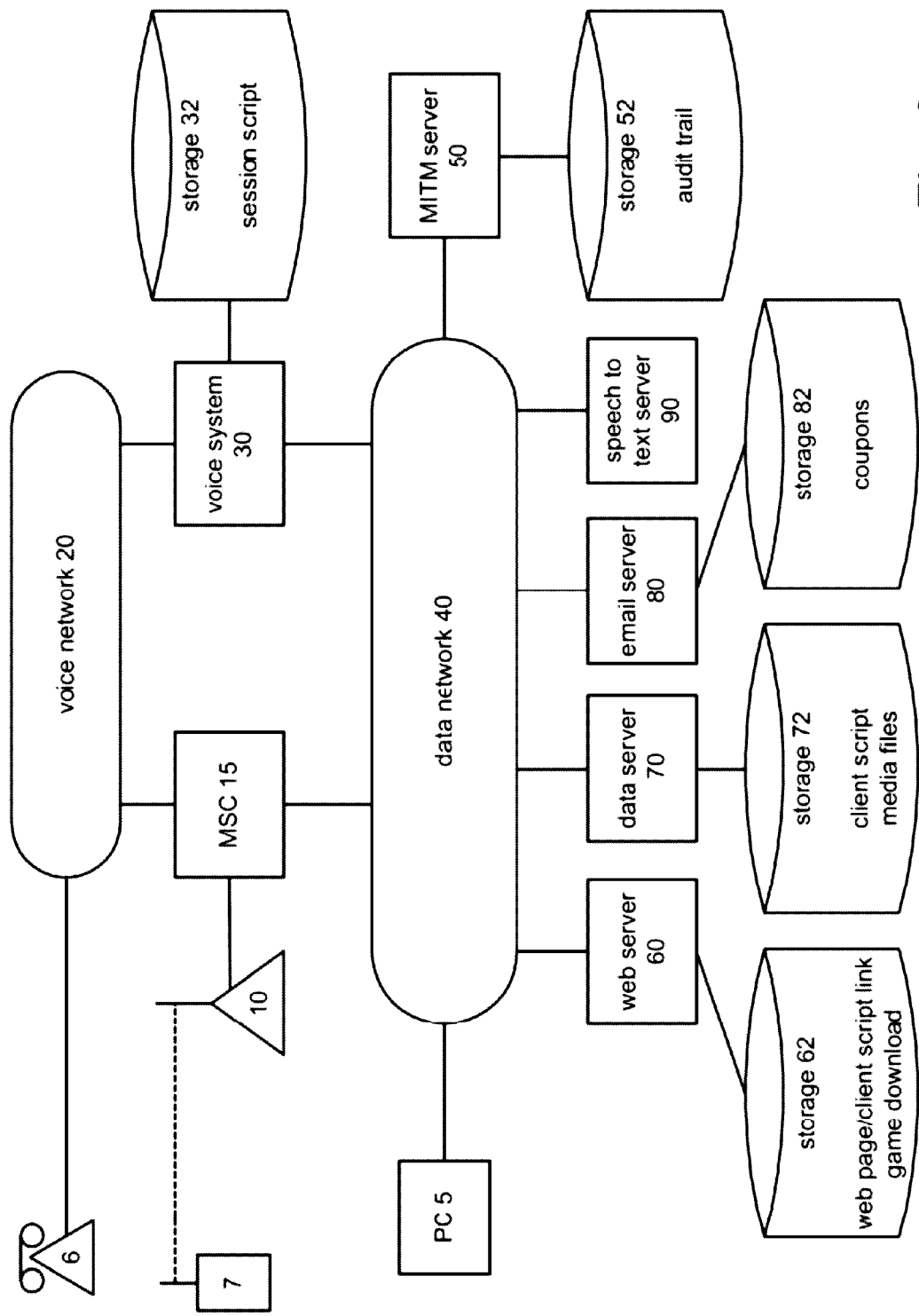
FIG. 3 is a block diagram showing the configuration assumed for a first use case.

FIG. 3 shows the configuration of FIG. 1 with data distributed according to this particular use case. Voice system 30 has storage 32 containing a session script for controlling a caller's interaction with voice system 30. MITM server 50 has storage 52 for storing audit trails. Web server 60 has storage 62 for storing web pages, including a web page having a link to a client script, and for storing a downloadable file with a game. Data server 70 has storage 72 for storing a client script and media files used by the client script. Email server 80 has storage 82 for storing coupons to be delivered via email, in response to authorized requests for the coupons.

FIGS. 4A-4G represent media files referred to in the use case and stored in storage 72. These figures show graphics. In other embodiments, the media files can be video, video with accompanying audio, audio, graphics, photographs, pdf files, presentation files such as Powerpoint presentations, or other appropriate files or combinations of files.

Figure 5:
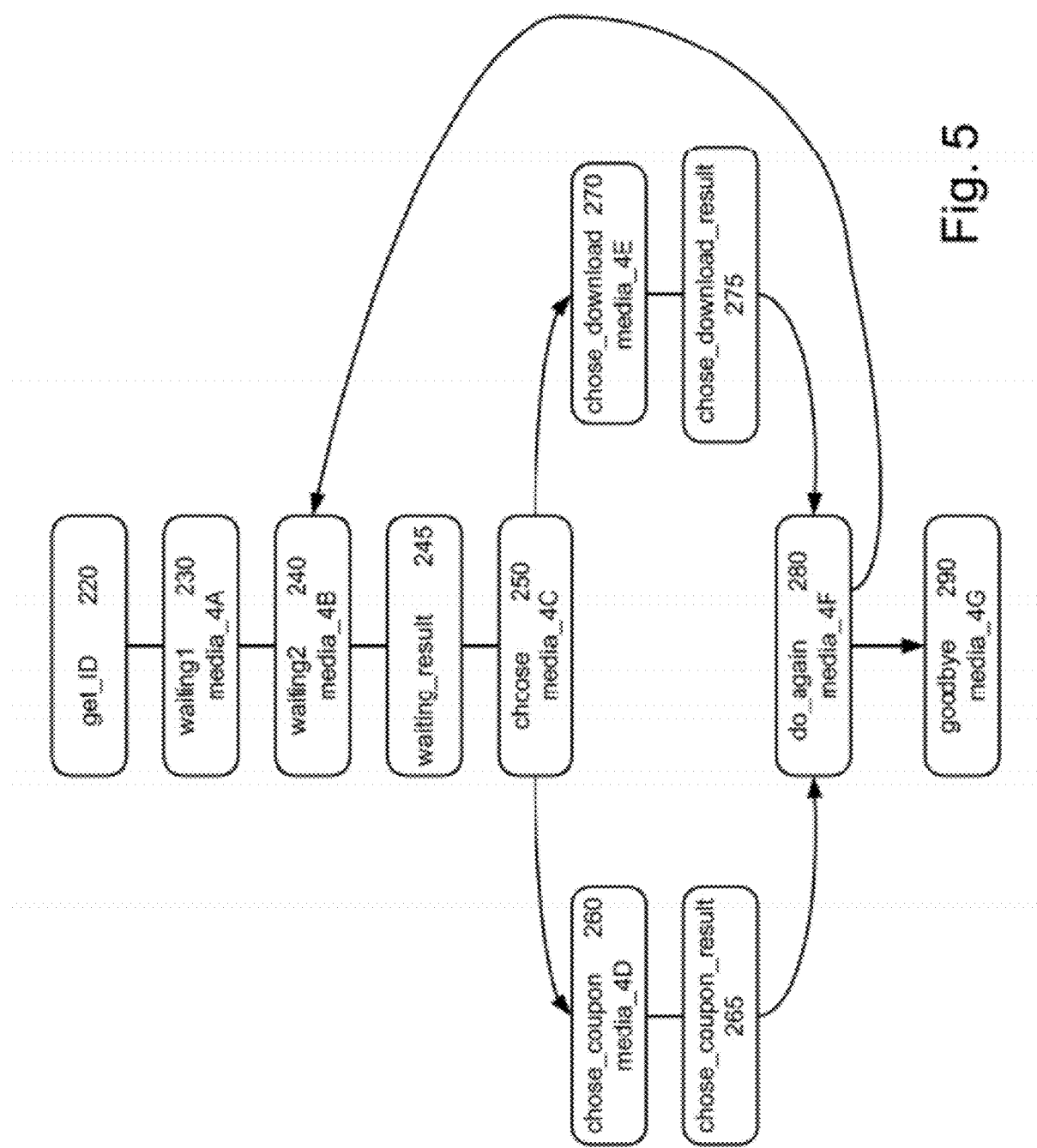
FIG. 5 is a diagram showing nodes in a script downloaded to PC 5 in the first use case.

FIG. 5 is a diagram showing nodes in a client script downloaded to PC 5 in the use case. The nodes are discussed, along with corresponding Interactive XML code. At the end of the discussion, the full script is provided in Table 1. For brevity, error handling steps are omitted.

The client script depicted in FIG. 5 may be written in any suitable scripting language, such as Interactive XML, authored by the present inventors, described in a script language specification available at www.interactiveXML.com. A copy of the Interactive XML script language specification is filed in an Information Disclosure Statement accompanying this application, and is incorporated by reference herein. Interactive XML uses the XML document format to support scripting of Adobe Flash-based interactive applications for display on web pages rendered by PC 5, or anywhere that Flash applications can run, such as on device 7.

At node 220, named "get_ID", PC 5 requests a unique ID from MITM server 50, and receives it. Let it be assumed that the ID is "98765". The unique ID is placed into a Flash cookie and can then be read by the script using the parameter ID. Note that Flash cookies are different than web browser cookies. To clear Flash cookies, the user must go to the Flash website; thus, it is likely that a Flash cookie value will rarely be cleared from PC 5. The Interactive XML for the get_ID node is:

```
<node name="get_ID">
    <get_id>
        <url>www.MITM50.com/admin/get_id.asp</url>
        <next_node>a_node</next_node>
    </get_id>
    <next_node>waiting1</next_node>
</node>
```

In a typical client script, rather than this simplified use case, get_ID would be preceded by a check for a cookie in PC 5 that indicates that a previous script already obtained an ID. If an ID has already been obtained, then there is no need to get a new ID.

Figure 4A:
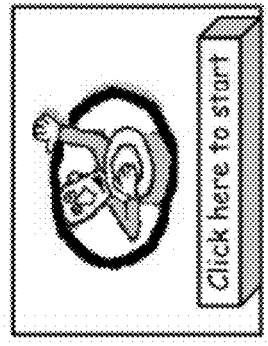
FIGS. 4A-4G represent media files referred to in the first use case.

At node 230, named "waiting1", PC 5 displays the media file shown in FIG. 4A, and waits until the user clicks to begin. The Interactive XML for the waiting1 node is:

```
<node name="waiting1">
    <medias>
        <media>
            <file>Fig4A.mp4</file>
        </media>
    </medias>
    <media_clicked node="waiting2"/>
</node>
```

Figure 4B:

At node 240, named "waiting2", PC 5 clears the long poll (in case a previous execution of the client script did not end properly) and displays the media file shown in FIG. 4B, overlaid with a banner (at the bottom) stating "917 111 2222 x98765". Note that the media file in FIG. 4B includes the instruction "call"; in other embodiments, the media file lacks the "call" instruction to the human, so the banner includes such instruction. In this use case, the unique ID is displayed to the user visually. In other cases, the unique ID is displayed to the user in other ways, such as being spoken or printed.

PC 5 commences the long poll technique with MITM server 50. The Interactive XML for the waiting2 node is:

```
<node name="waiting2">
    <long_poll>CLEAR</long_poll>
    <medias>
        <media>
            <file>Fig4B.mp4</file>
        </media>
    </medias>
    <text_banners>
        <text_banner name="phone">917 111 2222 x%ID%</text_banner>
    </text_banners>
    <long_poll connect="YES">
        <socket_server>www.MITM50.com</socket_server>
        <socket_port>8888</socket_port>
        <continuous>NO</continuous>
        <next_node>waiting result</next_node>
    </long_poll>
</node>
```

At node 245, named "waiting_result", PC 5 waits for a message from MITM server 50 that a voice connection has been made, specifically, an "INCOMING CALL" message, and when the message is received, processing continues at node 250. The Interactive XML for the waiting_result node is:

```
<node name="waiting result">
    <if cond="long_poll_value=='INCOMING CALL'">
        <long_poll connect="YES">
            <socket_server>www.MITM50.com</socket_server>
            <socket_port>8888</socket_port>
            <continuous>NO</continuous>
            <next_node>choose</next_node>
        </long_poll>
    </if>
</node>
```

Figure 4C:
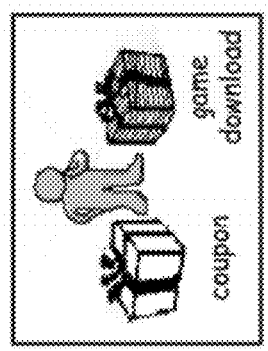

At node 250, named "choose", PC 5 displays the media file shown in FIG. 4C and waits for a message from MITM server 50. If the message is "coupon", processing continues at node 260. If the message is "download", processing continues at node 270. The Interactive XML for the choose node is:

```
<node name="choose">
    <medias>
        <media>
            <file>Fig4C.mp4</file>
        </media>
    </medias>
    <if cond="long_poll_value=='COUPON'">
        <next_node>chose_coupon</next_node>
    </if>
    <if cond="long_poll_value=='DOWNLOAD'">
        <next_node>chose_download</next_node>
    </if>
</node>
```

Figure 4D:
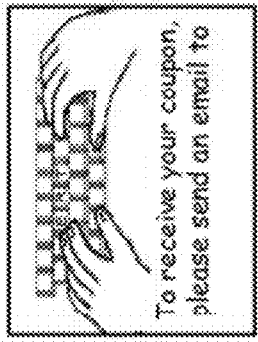

At node 260, named "chose_coupon", PC 5 displays the media file shown in FIG. 4D, overlaid with a banner (at the bottom) stating "98765@emailserver80.com" and goes to node 265. The Interactive XML for the chose_coupon node is:

```
<node name="chose_coupon">
    <medias>
        <media>
```

```
        <file>Fig4D.mp4</file>
      </media>
    </medias>
    <text_banner name=
"ID">%ID%@emailserver80.com</text_banner>
    <long_poll connect="YES">
        <socket_server>www.MITM50.com</socket_server>
        <socket_port>8888</socket_port>
        <continuous>NO</continuous>
        <next_node>choose_coupon_result</node>
    </long_poll>
</node>
```

At node 265, named "chose_coupon_result", PC 5 waits for a message from MITM server 50 confirming that the coupon has been sent. During the waiting period, it is assumed that the user sends an email as directed, then email server 80 checks whether the ID (98765) is valid by comparing it with IDs received within a predetermined time period, from either MITM server 50 or voice system 30; if valid, email server 80 emails the coupon and notifies MITM server 50 that the coupon was sent. When the message from MITM server 50 confirming that a coupon was sent is received, processing continues at node 280. If the user hangs up, the script does nothing; due to a time-out at MITM server 50, the unique ID will eventually be removed from the waiting list. The Interactive XML for the chose_coupon_result node is:

```
<node name="choose_coupon_result">
    <if cond="long_poll_value=='COUPON SENT'">
        <next_node>do_again</next_node>
    </if>
    <if cond="long_poll_value=='HANGUP'">
    </if>
<node/>
```

Figure 4E:
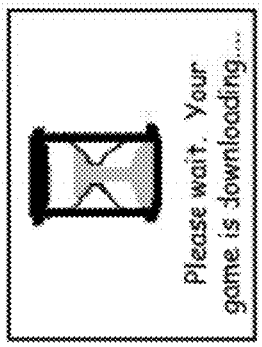

At node 270, named "chose_download", PC 5 displays the media file shown in FIG. 4E and goes to node 275. The Interactive XML for the chose_download node is:

```
<node name="chose_download">
    <medias>
        <media>
            <file>Fig4E.mp4</file>
        </media>
    </medias>
    <long_poll connect="YES">
        <socket_server>www.MITM50.com</socket_server>
        <socket_port>8888</socket_port>
        <continuous>NO</continuous>
        <next_node>chose_download_result</next_node>
    </long_poll>
</node>
```

At node 275, named "chose_download_result", PC 5 waits for a message from MITM server 50 confirming that the download has occurred. If the user hangs up, the script does nothing; due to a time-out at MITM server 50, the unique ID will eventually be removed from the waiting list. When the message is received, processing continues at node 280. The Interactive XML for the chose_download_result node is:

```
<node name="chose_download_result">
    <if cond="long_poll_value='DOWNLOAD OCCURRED'">
        <next_node>do_again</next_node>
    <if cond="long_poll_value=="HANGUP" "
    </if>
</node>
```

Figure 4F:

At node 280, named "do_again", PC 5 displays the media file shown in FIG. 4F. If the user clicks the "yes" button, processing returns to node 240. If the user clicks the "no" button, processing continues at node 290. The Interactive XML for the do_again node is:

```
<node name="do_again">
    <medias>
        <media>
            <file>Fig4F.mp4</file>
        </media>
    </medias>
    <buttons>
        <button>
            size, color, placement of button is omitted for brevity
            <text>YES</text>
            <next_node>waiting2</next_node>
        </button>
        <button>
            size, color, placement of button is omitted for brevity
            <text>NO</text>
            <next_node>goodbye</next_node>
        </button>
    </buttons>
</node>
```

Figure 4G:
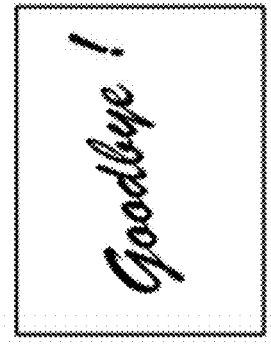

At node 290, named "goodbye", PC 5 displays the media file shown in FIG. 4G, and waits for the user to close the browser window. In some embodiments, PC 5 also sends a "done" message to MITM server 50. The Interactive XML for the goodbye node is:

```
<node name="goodbye">
    <medias>
        <media>
            <file>Fig4G.mp4</file>
        </media>
    </medias>
</node>
```

Table 1 shows an Interactive XML script corresponding to the script node diagram in FIG. 5. In this script, socket port 8888 is used. In other scripts, other ports may be used, such as the standard port 80.

TABLE 1

```
<?xml version="1.0" encoding="UTF-8"?>
<document>
<settings>
    <!-- button height, width, font, layout, color, omitted for brevity -->
    <!-- default banner height, width, font, color, omitted for brevity -->
    <!-- default video height, width, x location, y location, omitted for brevity -->
    <!-- where the media files are located -->
    <media_path>www.dataserver70.com/apps/use_case_pat_appl/media/</media_path>
```

TABLE 1-continued

```xml
    <!-- variables omitted for brevity -->
</settings>
<node name="get_ID">
    <get_id>
        <url>www.MITM50.com/admin/get_id.asp</url>
        <next_node>a_node</next_node>
    </get_id>
    <!-- get_id places the returned value into a Flash cookie variable named record_id
        which can be accessed within the xml with the variable ID -->
    <next_node>waiting1</next_node>
</node>
<node name="waiting1">
    <medias>
        <media>
            <file>Fig4A.mp4</file>
        </media>
    </medias>
    <media_clicked node="waiting2"/>
</node>
<node name="waiting2">
    <long_poll>CLEAR</long_poll>
    <medias>
        <media>
            <file>Fig4B.mp4</file>
        </media>
    </medias>
    <text_banners>
    <text_banner name="phone">
        <text>917 111 2222 x%ID%</text>
    </text_banner>
    </text_banners>
    <!-- the unique ID is displayed to the user as the extension for the number to call so the
        user can identify herself -->
    <long_poll connect="YES">
            <socket_server>www.MITM50.com</socket_server>
            <socket_port>8888</socket_port>
            <continuous>NO</continuous>
            <!-- when continuous=YES will automatically try to reconnect after an interval
            -->
            <next_node>waiting result</next_node>
    </long_poll>
</node>
<node name="waiting result">
    <if cond="long_poll_value=='INCOMING CALL'">
            <long_poll connect="YES">
            <socket_server>www.MITM50.com</socket_server>
            <socket_port>8888</socket_port>
            <continuous>NO</continuous>
            <next_node>choose</next_node>
        </long_poll>
    </if>
</node>
<node name="choose">
            <medias>
                <media>
                    <file>Fig4C.mp4</file>
                </media>
            </medias>
    <if cond="long_poll_value=='COUPON'">
        <next_node>chose_coupon</next_node>
    <elseif cond="long_poll_value=='DOWNLOAD'">
        <next_node>chose_download</next_node>
    </if>
</node>
<node name="chose_coupon">
    <medias>
        <media>
            <file>Fig4D.mp4</file>
        </media>
    </medias>
    <text_banners>
    <text_banner name="ID">%ID%@emailserver80.com</text_banner>
    </text_banners>
    <long_poll connect="YES">
        <socket_server>www.MITM50.com</socket_server>
        <socket_port>8888</socket_port>
        <continuous>NO</continuous>
        <next_node>choose_coupon_result</node>
    </long_poll>
</node>
```

TABLE 1-continued

```
<node name="choose_coupon_result">
    <if cond="long_poll_value=='COUPON SENT'">
        <next_node>do_again</next_node>
    </if>
    <if cond="long_poll_value=='HANGUP'">
        <!-- in this use case, nothing is done when HANGUP is received. In other
            cases, a HANGUP would probably cause a corresponding media display -->
    </if>
<node/>
<node name="chose_download">
    <medias>
      <media>
        <file>Fig4E.mp4</file>
      </media>
    </medias>
    <long_poll connect="YES">
        <socket_server>www.MITM50.com</socket_server>
        <socket_port>8888</socket_port>
        <continuous>NO</continuous>
        <next_node>chose_download_result</node>
    </long_poll>
</node>
<node name="chose_download_result">
    <if cond="long_poll_value=='DOWNLOAD OCCURRED'">
        <next_node>do_again</next_node>
    <if cond="long_poll_value=='HANGUP' ">
    </if>
</node>
<node name="do_again">
    <medias>
      <media>
        <file>Fig4F.mp4</file>
      </media>
    </medias>
    <buttons>
      <button>
          <!-- size, color, placement of button is omitted for brevity -->
          <text>YES</text>
          <next_node>waiting2</next_node>
      </button>
      <button>
          <!-- size, color, placement of button is omitted for brevity -->
          <text>NO</text>
          <next_node>goodbye</next_node>
      </button>
    </buttons>
</node>
<node name="goodbye">
    <medias>
      <media>
        <file>Fig4G.mp4</file>
      </media>
    </medias>
</node>
</document>
```

Figure 6:
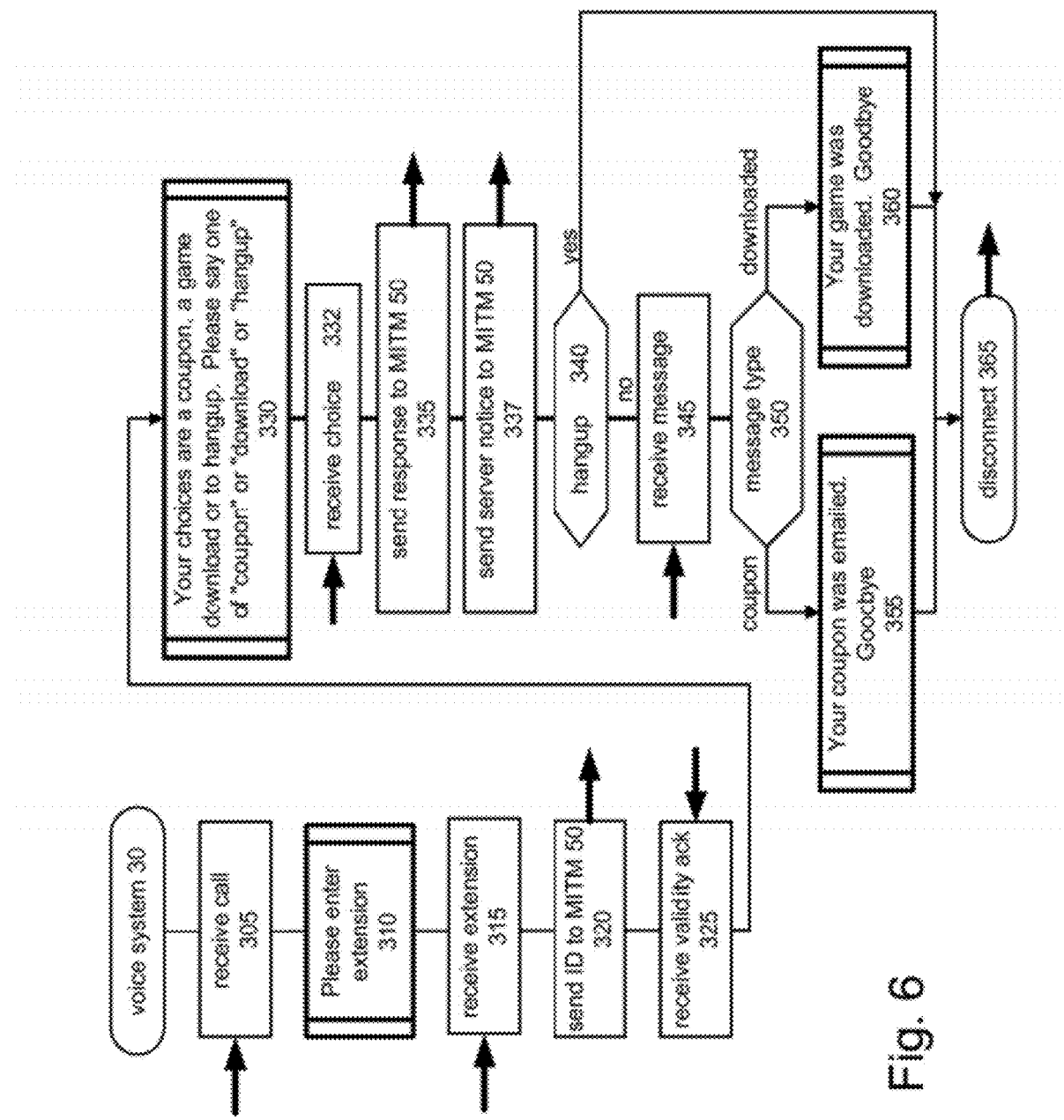
FIG. 6 is a flowchart showing operation of voice system 30 in the first use case.

FIG. 6 is a flowchart showing operation of voice system 30 in the use case. This flowchart corresponds to the session script shown in FIG. 3 storage 32. In this flowchart, a box with bold outlining and double-vertical-line edges indicates an audible response provided by voice system 30 to the caller. The audible response may be a pre-recorded speech signal, or may be a synthesized speech signal.

At step 305, voice system 30 receives an incoming call, and automatically accepts it, that is, goes to a "line off hook" state.

At step 310, voice system 30 says "Please enter extension" to the caller. The extension is the unique ID obtained by PC 5 when executing the client script downloaded from data server 70.

At step 315, voice system 30 receives the extension entered by the caller. Any suitable entry method may be used, such as speaking numbers, or selecting keys on a dual tone multi-frequency (DTMF) handset. As is well known, in a DTMF handset, each handset key corresponds to a particular group of two tones that are transmitted in the voiceband, which can be easily recognized by voice system 30. Voice system 30 is capable of recognizing utterances corresponding to numerals, such as "oh" and "zero" corresponding to "0". Although not shown, the session script may provide for a confirmation step, where voice system 30 speaks the received ID to the caller, to give the caller a chance to ensure that the correct number was provided. That is, a mistake could occur due to the caller error in repeating the extension shown on the display of PC 5, or by voice system 30 in recognizing a correctly provided extension.

At step 320, voice system 30 sends the ID obtained at step 315 to MITM server 50, along with its own internally generated identifier for this session and its address on data network 40. This additional information is useful if the session script for voice system 30 will depend on information received from another entity.

At step 325, voice system 30 receives a validity acknowledgement from MITM server 50. Although not shown, the session script may include responding to a "not valid" message from MITM server 50 by giving the caller another chance to enter the ID; after two chances, voice system 30 hangs up.

At step 330, voice system 30 says, to the caller, "Your choices are a coupon, a game download or to hangup. Please say one of 'coupon' or 'download' or 'hangup'".

At step 332, voice system 30 receives a response from the caller. Although not shown, the session script may provide a check that the response is one of "coupon", "download" or "hangup" and if not, give the caller another chance to provide one of these choices. If a proper response is not received, voice system 30 tells the caller that it cannot process the caller's response and will hang up, and processing continues at step 365.

At step 335, voice system 30 sends the response to MITM server 50 for forwarding to PC 5.

At step 337, voice system 30 sends a message to MITM server 50. If the response was "coupon", then the message is explicitly addressed to email server 80 and informs email server 80 that the ID is valid, so that email server 80 may validate an email soon-to-arrive with the specified ID. If the response was "download", then the message is explicitly addressed to web server 60 and instructs web server 60 to be prepared to download a particular file to the address associated with the ID. As explained with regard to FIG. 2, step 126, MITM server 50 can translate an ID to a physical address in an explicitly addressed message. It will be recalled that a web browser must request data, that is, an external device cannot push data to a web browser. However, an external device can send data to MITM server 50, which can hold the data and send it to the web browser in response to a long poll from the web browser.

More specifically, there are at least two methods by which the game file can be downloaded to PC 5. In one method, in response to a long poll from PC 5, MITM server 50 sends a message to PC 5, instructing PC 5 to request the game download from web server 60 with an appropriate credential, such as a one-time password; web server 60 is prepared to respond to this download request. In another method, web server 60 sends the download to MITM server 50, which provides the download to PC 5 in response to a long poll from PC 5. This method is available only if the size of the download is sufficiently small to fit the size constraints of a long poll response.

At step 340, voice system 30 checks whether the response was "hangup". If so, processing proceeds to step 365.

If the response was "coupon" or "download" then at step 345, voice system 10 waits for a message confirming that the coupon was sent or the download was provided. In this use case, the message originates from PC 5, and includes the session identifier provided to MITM server 50 at step 320, because the client script is written that way. In other cases, the message originates from MITM server 50 or from a third party server such as email server 80 for the coupon or web server 50 for the download.

At step 350, voice system 30 determines what type of message was received. If the message was that the coupon was sent, processing proceeds to step 355. If the message was the download was accomplished, processing proceeds to step 360.

At step 355, voice system 30 says to the caller "Your coupon was emailed. Goodbye" and processing continues at step 365.

At step 360, voice system 30 says to the caller "Your game was downloaded. Goodbye" and processing continues at step 365.

At step 365, voice system 30 automatically hangs up, that is, goes to a "line on hook" state, and processing is complete.

Figure 7B:
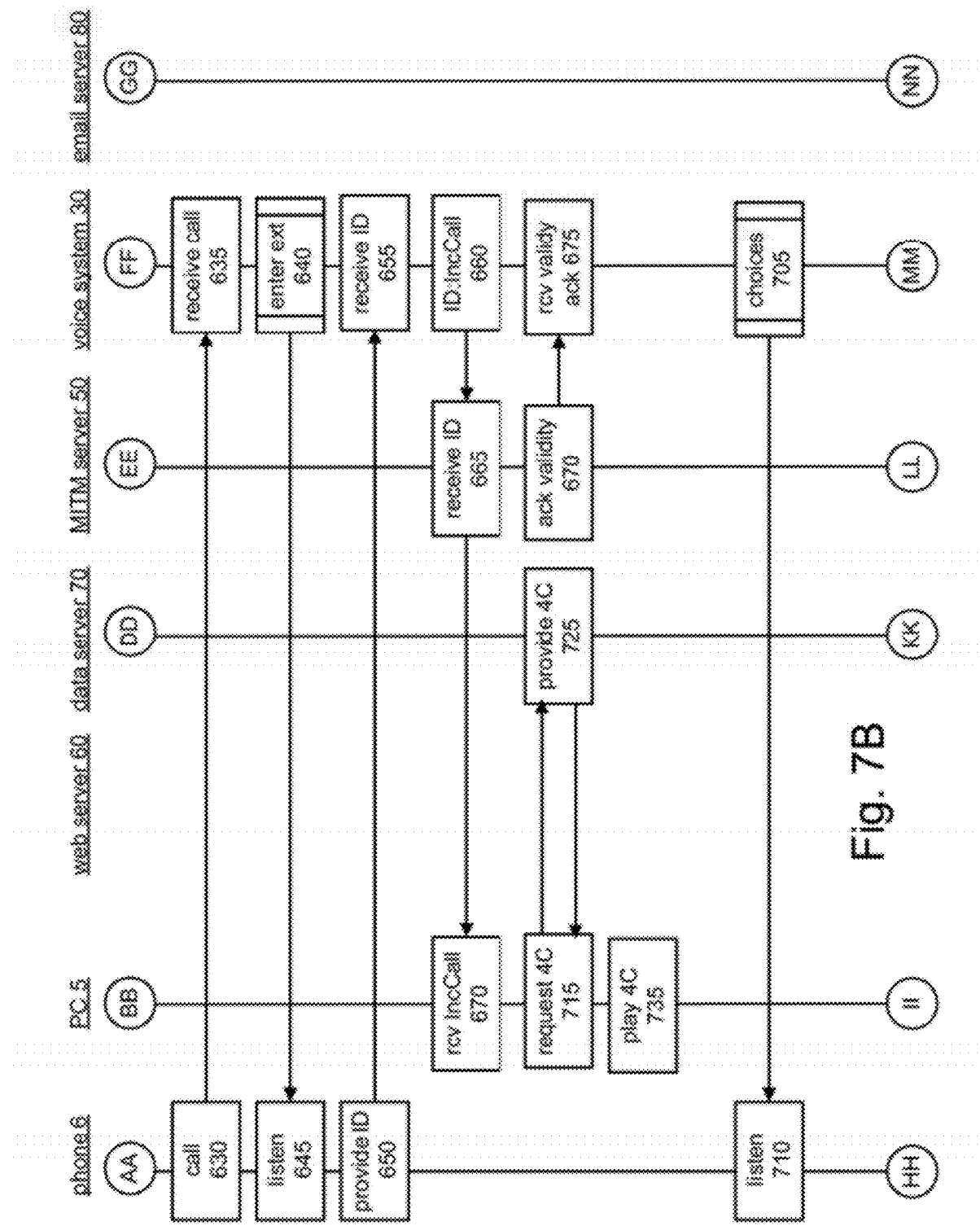
Figure 7C:
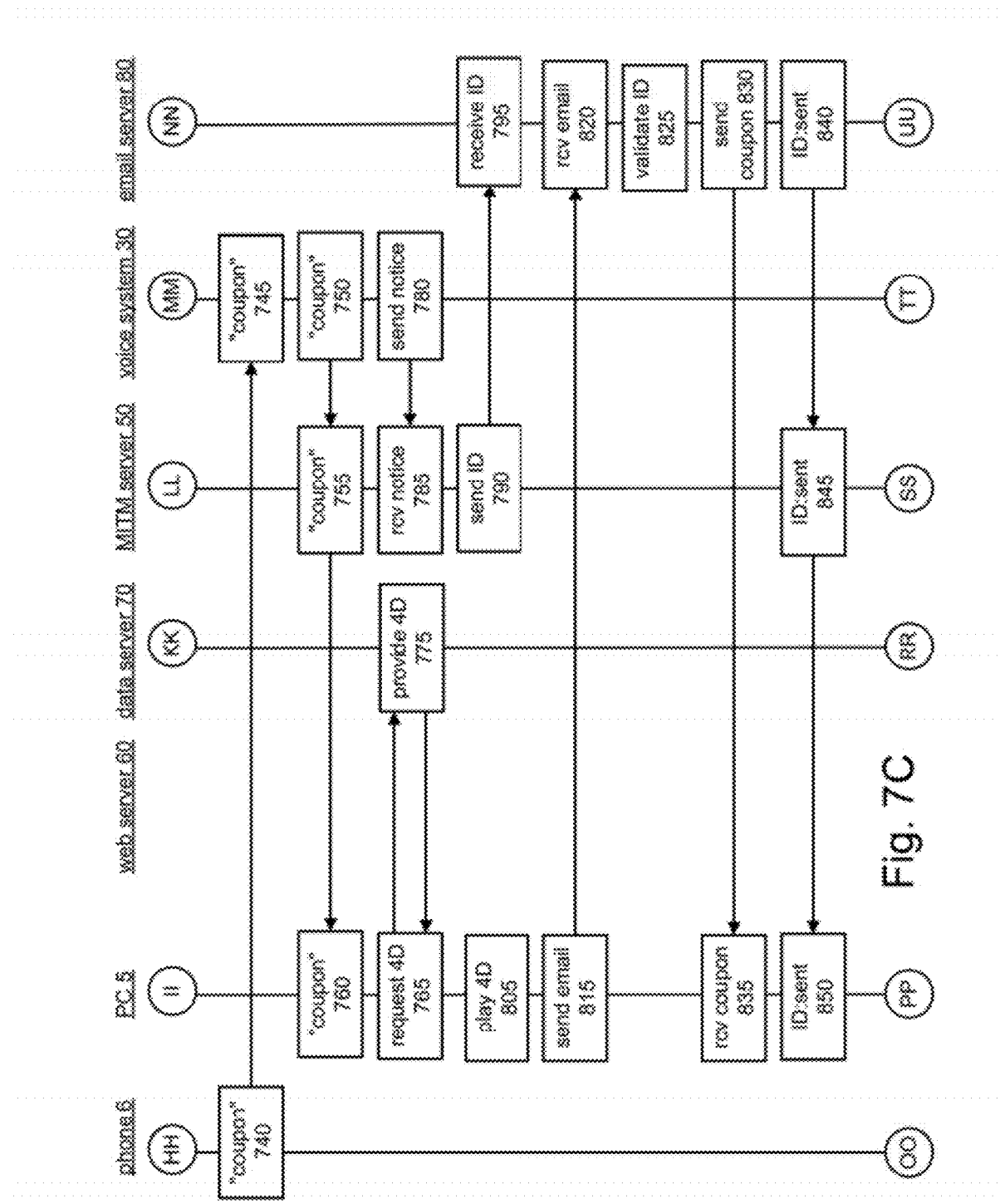
Figure 7D:
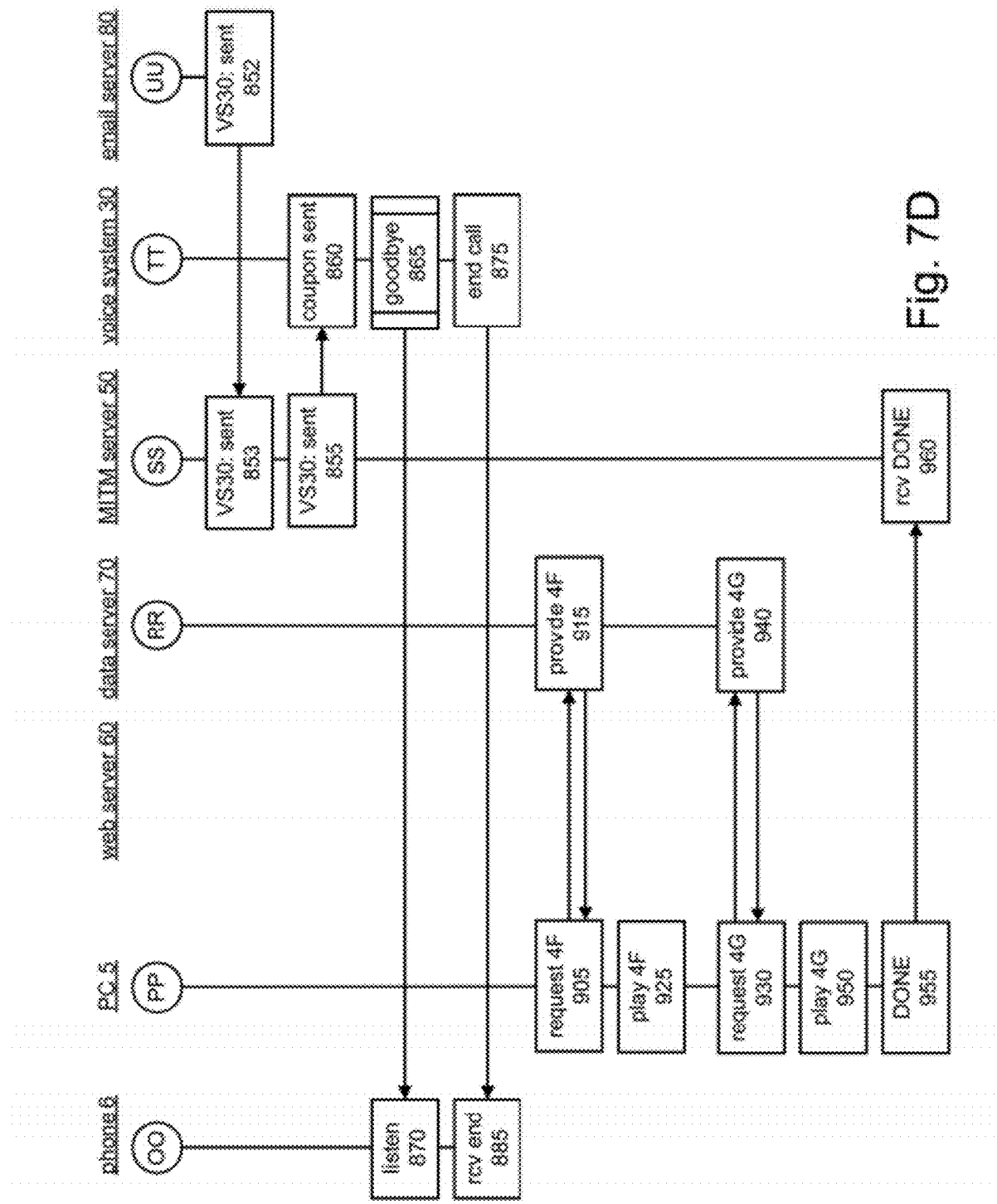

FIGS. 7A-7D, collectively referred to as FIG. 7, are a flowchart showing operation of a first use case. This use case illustrates how one third party server, voice system 30, 9 communicates with another third party server, email server 80, via MITM server 50, to authorize email server 80 to take an action requested by PC 5, sending a electronic coupon to PC 5.

At step 505, PC 5 requests a web page from web server 60.

At step 515, web server 60 provides the web page to PC 5.

At step 525, a browser in PC 5 renders the received web page, which includes software that sends a request to data server 70 for a script. The browser automatically, without intervention by a human user, requests the script.

At step 535, data server 70 provides the script to the browser in PC 5. The script may be written in any suitable scripting language. Let it be assumed that the script is written in Interactive XML, and is the script shown in Table 1 and depicted in FIG. 5.

At step 545, PC 5 begins executing the script, starting with get_ID node 220 shown in FIG. 5, which automatically, without human intervention, sends a message to MITM server 50 requesting a unique ID.

At step 555, MITM server 50 provides a unique ID to PC 5, along with a confirmation number, and stores the unique ID, confirmation number and data network address of PC 5. Let is be assumed that the unique ID is "98765".

At step 565, PC 5 continues executing the script at node waiting1, and requests file media_4A from data server 70.

At step 575, data server 70 provides file media_4A to PC 5.

At step 585, PC 5 renders file media_4A, shown in FIG. 4A, inviting the human user to mouse click to start activity. Actually, scripted activity has already begun, but it has been invisible to the user.

At step 605, the human user clicks on the screen shown in FIG. 4A, and PC 5 begins executing node waiting2. Specifically, PC 5 requests file media_4B from data server 70, and sends a long poll to MITM server 50 (not shown), which causes MITM server 50 to put PC 5 on its waiting list (see FIG. 2 step 112). For the rest of this example, let it be assumed that PC 5 is continuously long polling to MITM server 50.

At step 615, data server 70 provides file media_4B to PC 5.

At step 625, PC 5 renders file media_4B, shown in FIG. 4B, inviting the human user to call a predefined phone number with the unique ID as the extension for the phone number.

At step 630, the human user uses phone 6 to place a call to the phone number shown at step 625.

At step 635, voice system 30 receives the incoming call (see FIG. 6 step 305).

At step 640, voice system 30 generates a voiceband signal, "Enter the extension" via a pre-recorded signal or via speech synthesis and plays the signal to the caller (see FIG. 6 step 310).

At step 645, the human user listens to the "Enter the extension" signal.

At step 650, the human user enters the extension shown at step 625, namely, the unique ID 98765 from MITM server 50. Entry may be via depressing DTMF keys on a keypad or by speaking numbers or any other suitable input method, such as touching areas on a touch-sensitive screen of phone 6.

At step 655, voice system 30 receives the extension (unique ID) entered by the human user (see FIG. 6 step 315).

At step 660, voice system 30 sends the unique ID to MITM server 50 with an "Incoming Call" message (see FIG. 6 step 320).

At step 665, MITM server 50 receives the (unique ID: Incoming Call) message (see FIG. 2 step 140), determines that the unique ID is on its waiting list—from the action at step 605—and since there is no explicit address in the message, sends it to the device associated with the unique ID, namely PC 5 (see FIG. 2 steps 148 and 114). Also, at step 670, MITM server 50 sends an acknowledgement to voice system 30 that this is a valid ID. At step 675, voice system 30 receives the validity acknowledgement (see FIG. 5 step 325).

At step 670, PC 5 receives the "Incoming Call" message and proceeds to choose node 250 of FIG. 5. At step 715, PC 5 requests file media_4C from data server 70. At step 725, data server 70 provides file media_4C to PC 5. At step 735, PC 5 plays file media_4C (see FIG. 4C), an image showing a user choosing between a coupon and a game download.

At step 705, voice system 30 generates an audible message to phone 6, "Your choices are a coupon, a game download or to hangup. Please say one of 'coupon' or 'download' or 'hangup'." (see FIG. 6 step 330).

At step 710, the human user listens to the audible message on phone 6 and looks at the display on PC 5. It will be appreciated that the human user perceives a co-ordinated multimedia experience, although PC 5 and phone 6 are operating independently.

At step 740, the human utters "coupon" to phone 6.

At step 745, voice system 30 receives the utterance (see FIG. 6 step 332).

At step 750, voice system 30 uses speech-to-text technology to convert the utterance into the text "COUPON", and sends this text and the extension (unique ID) to MITM server 50 (see FIG. 6 step 335). At step 755, MITM server 50 receives the message and forwards it to PC 5. At step 760, PC 5 receives a message with the text COUPON and proceeds to chose_coupon node 260 (see FIG. 5).

At step 765, PC 5 requests file media_4D from data server 70. At step 775, data server 70 provides file media_4D to PC 5. At step 735, PC 5 plays file media_4D (see FIG. 4D), an image showing fingers typing on a keyboard with textual instructions, "To receive your coupon, please send an email to 98765@emailserver80.com". It will be recalled that 98765 is the unique ID for PC 5, assigned by MITM server 50. PC 5 then proceeds to chose_coupon_result node 265 and continues send long polls to MITM server 50.

At step 780, voice system 30 sends a message to MITM server 50, explicitly addressed to email server 80, indicating that 98765 is a valid requestor for a predetermined time, such as ten minutes (see FIG. 6 step 337). At step 785, MITM server 50 receives the message and at step 790, forwards the message indicating that 98765 is a valid ID to email server 80.

At step 795, email server 80 receives the message from MITM server 50 indicating that 98765 is a valid ID.

At step 815, the human user sends an email from PC 5 to email server 80 using its local mail program. The email is addressed to 98765@emailserver80.com. At step 820, email server 80 receives the email.

At step 825, operating according to its own script (not shown), email server 80 compares the address in the email (98765) with its list of valid (Ds, and determines there is a match, that is, the address is validated. At step 830, email server 80, according to its script, responds by sending an email with a coupon to PC 5.

At step 835, PC 5 receives an email from email server 80 containing the coupon. However, this event is transparent to the Flash script executing at PC 5.

At step 840, email server 80 sends a message including the unique ID 98765 and the text "COUPON SENT" to MITM server 50. At step 845, MITM server 50 receives the message and forwards it to PC 5. At step 850, PC 5 receives a message from MITM server 50 indicating COUPON SENT. This message causes PC 5 to advance to do_again node 280 in FIG. 5.

At step 852, email server 80 sends a message to MITM server 50, addressed to voice system 30 with the text "COUPON SENT". At step 853, MITM server 50 receives this message. At step 855, MITM server 50 forwards this message to voice system 30. At step 860, voice system 30 receives the "COUPON SENT" message (see FIG. 6 step 345). Voice system 30 examines the message (FIG. 6 step 350).

At step 865, voice system 30 generates a voiceband signal, "Your coupon was emailed. Goodbye." (FIG. 6 step 355).

At step 870, the user listens to the voiceband signal received on phone 6.

At step 875, voice system 30 terminates the call by generating an on-hook signal (see FIG. 6 step 365). At step 885, phone 6 receives the on-hook signal and produces a dial-tone or provides a display showing the call has ended.

At step 905, at do_again node 280 (see FIG. 5), PC 5 requests file media_4F from data server 70. At step 915, data server 70 provides file media_4F to PC 5. At step 925, PC 5 plays file media_4F (see FIG. 4F), inviting the user to choose between repeating the activity or moving on. Let it be assumed that the user elects to not repeat the activity, and clicks on the appropriate button displayed by file media_4F. The button being clicked causes PC 5 to proceed to goodbye node 290 (see FIG. 5).

At step 930, at goodbye node 290, PC 5 requests file media_4G from data server 70. At step 940, data server 70 provides file media_4G to PC 5. At step 950, PC 5 plays file media_4G (see FIG. 4G), a goodbye display.

At step 955, PC 5 sends a "done" message to MITM server 50.

At step 960, MITM server 50 receives the "done" message and removes PC 5 from its waiting list (see FIG. 2 step 122).

A second use case will now be described.

This use case illustrates monetization of video. Video content is provided via a device as long as a separate phone connection exists to a billing number. The phone connection is billed by the telephone services provider, enabling monetization of video for people who do not have credit cards.

Figure 8:
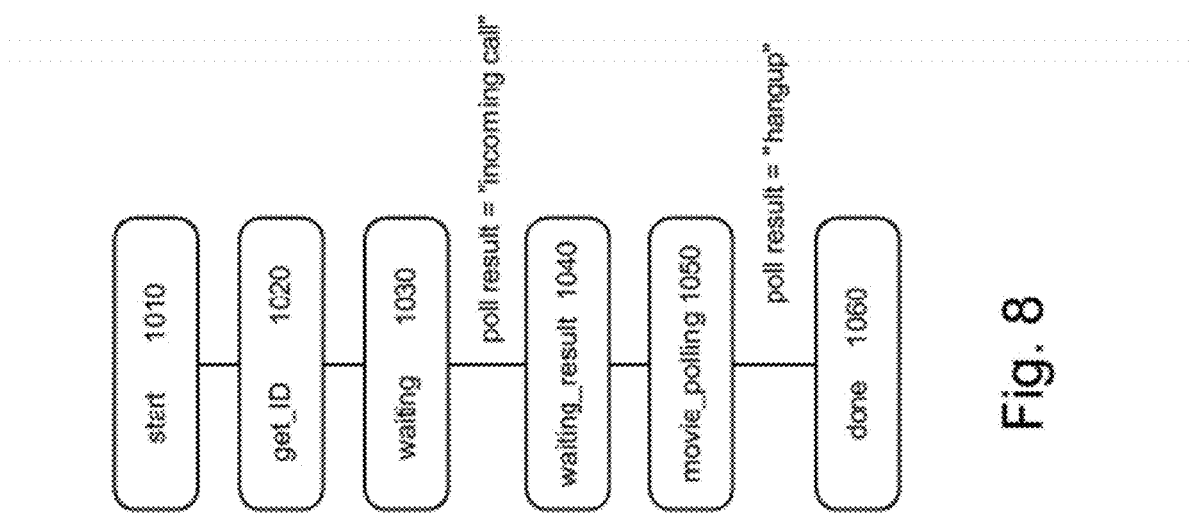
FIG. 8 is a diagram showing nodes in a script downloaded to PC 5 in a second use case.

FIG. 8 shows a script that executes at PC 5. The entire script is shown in Table 2.

At start node 1010, a welcome image is displayed, and then PC 5 proceeds to the get_ID node. The Interactive XML for start node 1010 is:

```
<node name="start">
    <medias>
        <media>
            <file>WELCOME_IMAGE.jpg</file>
        </media>
    </medias>
    <next_node>getID</next_node>
</node>
```

At get_ID node 1020, PC 5 gets a unique ID from MITM server 50 then proceeds to the waiting node. The Interactive XML for get_ID node 1020 is:

```
<node name="getID">
    <get_id>
        <url>www.MITM50.com/admin/get_id.asp</url>
        <next_node>waiting</next_node>
    </get_id>
</node>
```

At waiting node 1030, PC 5 displays a screen with instructions to call a phone number having an extension that is the unique ID, begins long polling of MITM server 50 and proceeds to the waiting_result node. The Interactive XML for waiting node 1030 is:

```
<node name="waiting">
<text_banners>
banner display formatting omitted for brevity
    <text>
        <p align="center">To start movie call - 917 1112222 x%ID%</p>
    </text>
</text_banners>
<long_poll connect="YES">
    <socket_server>www.MITM50.com</socket_server>
    <socket_port>8888</socket_port>
    <continuous>NO</continuous>
    <delimiter>,</delimiter>
    <next_node>waiting result</next_node>
</long_poll>
</node>
```

At waiting_result node 1040, when PC 5 receives a message of "INCOMING CALL" from MITM server 50, PC 5 plays the file for the movie, and proceeds to the movie_polling node. When the interaction starts, PC 5 clears the text banner showing the phone number to call. The Interactive XML for waiting_result node 1040 is:

```
<node name="waiting result">
    <if cond="long_poll_value=='INCOMING CALL'">
        <medias>
            <media>
                <file>THE_MOVIE.mp4</file>
```

```
            </media>
        </medias>
        <long_poll connect="YES">
            <socket_server>www.MITM50.com</socket_server>
            <socket_port>8888</socket_port>
            <continuous>NO</continuous>
            <delimiter>,</delimiter>
            <next_node>movie polling</next_node>
        </long_poll>
        <text_banners>
            <text_banner>
                <name>mybanner</name>
                <clear>YES</clear>
            </text_banner>
        </text_banners>
    </if>
</node>
```

At movie_polling node 1050, PC 5 waits for a "HANGUP" message from MITM server 50, and when the message arrives, stops playing the movie, and proceeds to the done node. The Interactive XML for movie_polling node 1050 is:

```
<node name="movie polling">
    <if cond="long_poll_value=='HANGUP'">
        <medias>
            <media>
                <file>CLEAR</file>
            </media>
        </medias>
        <next_node>start</next_node>
    <else/>
        <long_poll connect="YES">
            <socket_server>www.MITM50.com</socket_server>
            <socket_port>8888</socket_port>
            <continuous>NO</continuous>
            <delimiter>,</delimiter>
            <next_node>movie polling</next_node>
        </long_poll>
    </if>
    <media_end node="done"/>
</node>
```

At done node 1060, PC 5 displays a "thank you" image. The Interactive XML for done node 1060 is:

```
<node name="done">
    <medias>
        <media>
            <file>THANK_YOU.jpg</file>
        </media>
    </medias>
</node>
```

Table 2 shows the entire script for PC 5 for the second use case.

TABLE 2

```
<?xml version="1.0" encoding="UTF-8"?>
<document>
<settings>
    <!-- button height, width, font, layout, color, omitted for brevity -->
    <!-- default banner height, width, font, color, omitted for brevity -->
    <!-- default video height, width, x location, y location, omitted for brevity -->
    <!-- where the media files are located -->
    <media_path>www.dataserver70.com/apps/use_case_pat_appl/media/</media_path>
    <!-- variables omitted for brevity -->
</settings>
<node name="start">
    <medias>
```

TABLE 2-continued

```
        <media>
            <file>WELCOME_IMAGE.jpg</file>
        </media>
    </medias>
    <next_node>getID</next_node>
</node>
<node name="getID">
    <get_id>
        <url>www.MITM50.com/admin/get_id.asp</url>
        <next_node>waiting</next_node>
    </get_id>
</node>
<node name="waiting">
    <text_banners>
     <text_banner>
      <name>mybanner</name>
      <x>0</x>
      <y>220</y>
      <text_color>#FFFFFF</text_color>
      <height>20</height>
      <width>300</width>
      <font>Arial</font>
      <font_size>12</font_size>
      <text>
       <p align="center">To start movie call - 917 111 2222 x%ID%</p>
      </text>
     </text_banner>
    </text_banners>
    <long_poll connect="YES">
        <socket_server>www.MITM50.com</socket_server>
        <socket_port>8888</socket_port>
        <continuous>NO</continuous>
        <delimiter>,</delimiter>
        <next_node>waiting result</next_node>
    </long_poll>
</node>
<node name="waiting result">
    <if cond="long_poll_value=='INCOMING CALL'">
        <medias>
            <media>
                <file>THE_MOVIE.mp4</file>
            </media>
        </medias>
        <long_poll connect="YES">
            <socket_server>www.MITM50.com</socket_server>
            <socket_port>8888</socket_port>
            <continuous>NO</continuous>
            <delimiter>,</delimiter>
            <next_node>movie polling</next_node>
        </long_poll>
        <text_banners>
            <text_banner>
                <name>mybanner</name>
                <clear>YES</clear>
            </text_banner>
        </text_banners>
    </if>
</node>
<node name="movie polling">
    <if cond="long_poll_value=='HANGUP'" >
        <medias>
          <media>
            <file>CLEAR</file>
          </media>
        </medias>
        <next_node>start</next_node>
    <else/>
        <long_poll connect="YES">
            <socket_server>www.MITM50.com</socket_server>
            <socket_port>8888</socket_port>
            <continuous>NO</continuous>
            <delimiter>,</delimiter>
            <next_node>movie polling</next_node>
        </long_poll>
    </if>
    <media_end node="done"/>
</node>
<node name="done">
    <medias>
        <media>
```

TABLE 2-continued

```
        <file>THANK_YOU.jpg</file>
      </media>
    </medias>
  </node>
</document>
```

Figure 9:
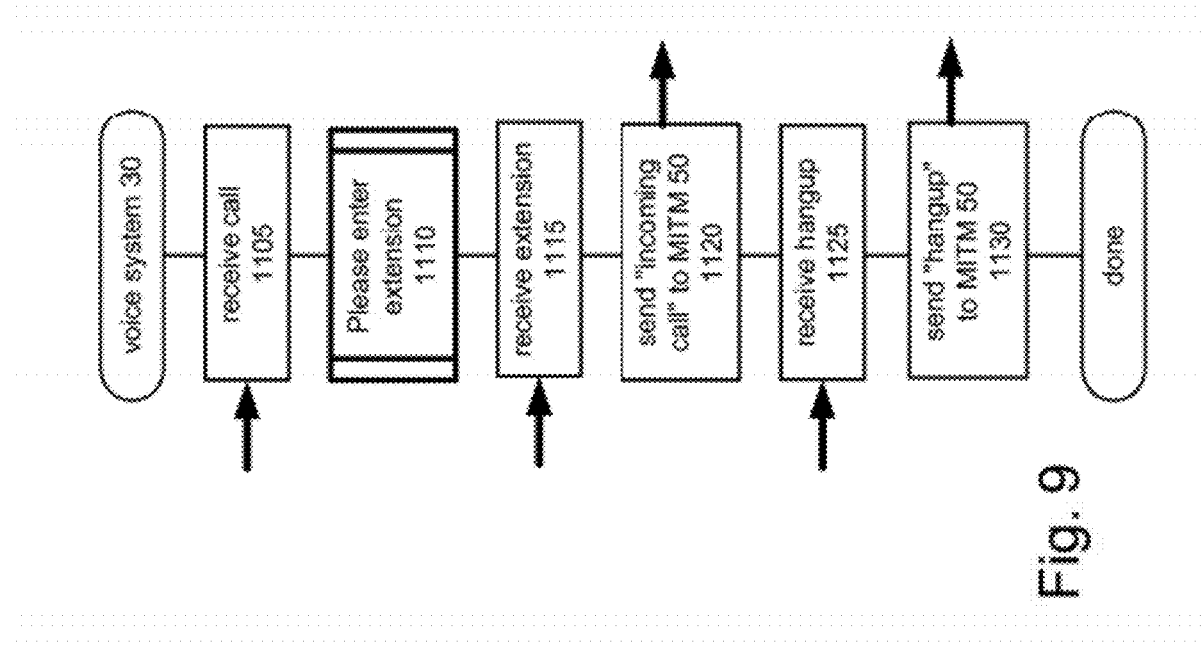
FIG. 9 is a flowchart showing operation of voice system 30 in the second use case.

FIG. 9 shows a script for voice system 30 for the second use case.

At step 1105, voice system 30 receives an incoming call.

At step 1110, voice system 30 generates a signal "please enter extension" to the caller.

At step 1115, voice system 30 receives the extension, that is, the unique ID provided by MITM server 50.

At step 1120, voice system 30 sends a message to MITM server 50 including the unique ID and the content "Incoming Call".

At step 1125, voice system 30 receives a call termination from the caller, that is, an on-hook signal.

At step 1130, voice system 30 sends a message to MITM server 50 including the unique ID and the content "Hangup".

Figure 10A:
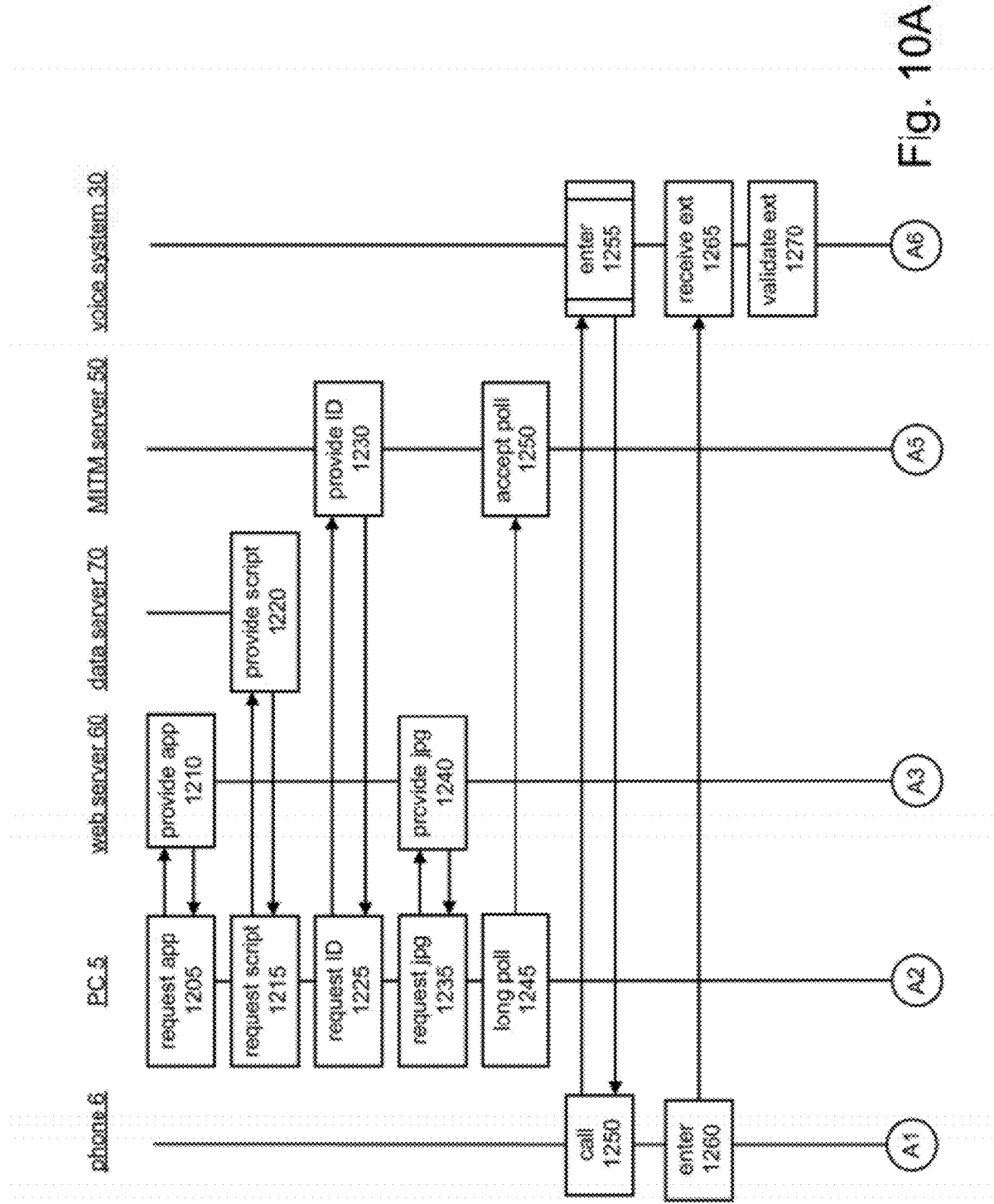
FIGS. 10A-10B are a flowchart showing operation of the second use case.
Figure 10B:
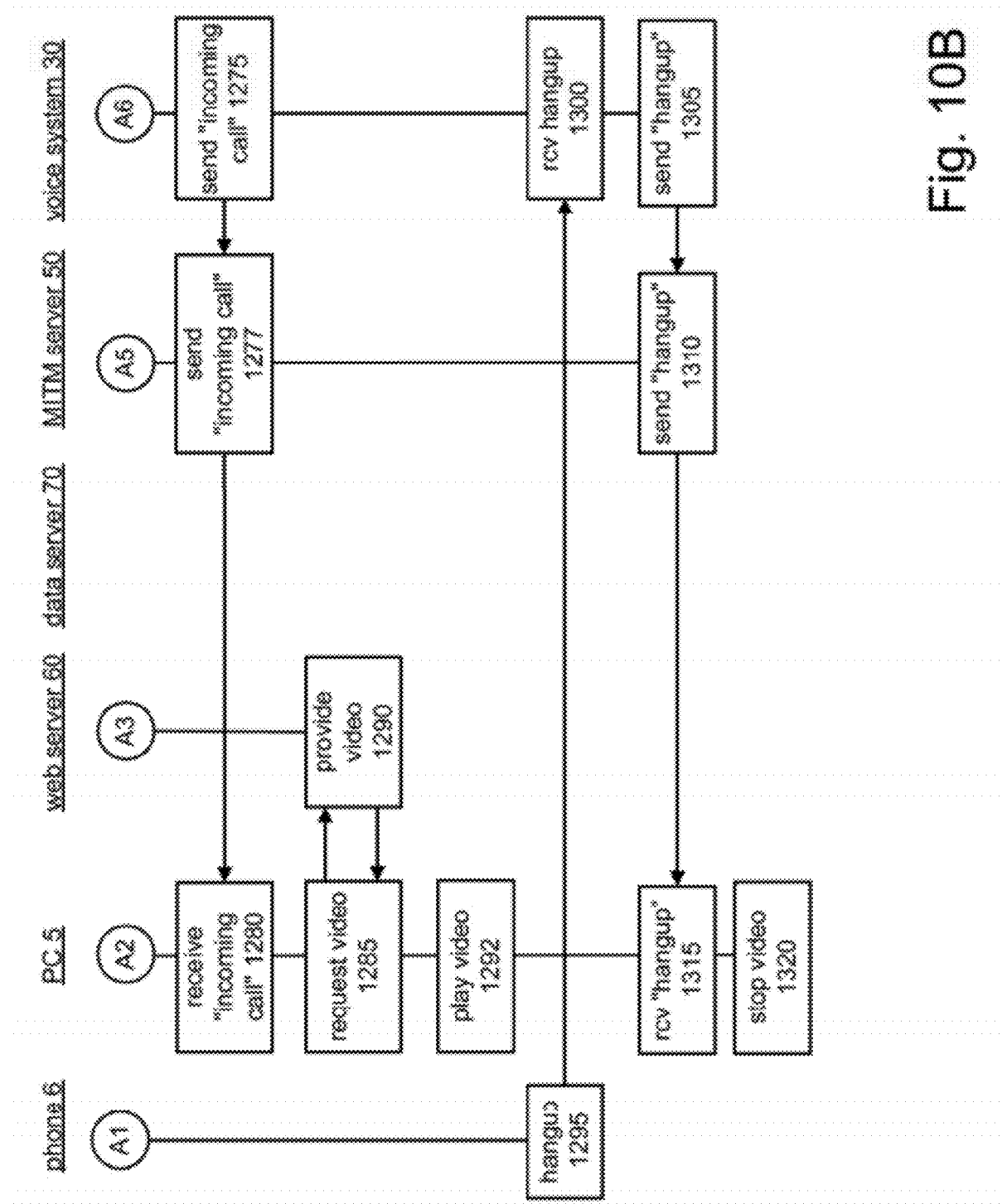

FIGS. 10A-10B, collectively referred to as FIG. 10, are a flowchart showing operation of the second use case.

At step 1205, PC 5 requests a web page from web server 60. At step 1210, web server 60 provides the requested web page.

At step 1215, PC 5 renders the web Page, including code embedded in the web page that causes PC 5 to request a script from data server 70. At step 1220, data server 70 provides the requested script, specifically, the script shown in Table 2 and FIG. 8.

At step 1225, PC 5 starts executing the script, and according to the script, requests a unique ID from MITM server 50. At step 1230, MITM server 50 provides a unique ID to PC 5.

At step 1235, PC 5 requests an image file from web server 60. At step 1240, web server 60 provides the image file. PC 5 displays the image file with overlaid text showing the phone number to call and the extension, the extension being the unique ID.

At step 1245, PC 5 commences long polling to MITM server 50. At step 1250, MITM server 50 accepts the long poll, and puts PC 5 on its waiting list.

At step 1250, phone 6 places a call to the indicated phone number. At step 1255, voice system 30 receives the incoming call and asks the caller to enter an extension.

At step 1260, the caller enters the extension, that is, the unique ID displayed in the text on PC 5.

At step 1265, voice system 30 receives the extension, and at step 1270, voice system 30 validates the extension by sending it to MITM server 50 (not shown).

At step 1275, voice system 30 sends a message to MITM server 50 including the unique ID and the content "Incoming Call". At step 1277, MITM server 50 receives the message and forwards it to PC 5.

At step 1280, PC 5 receives the "Incoming Call" message. According to the script, at step 1285, PC 5 sends a request to web server 60 for the movie video.

At step 1290, web server 60 receives the request and responds to it by sending the movie to PC 5. In one embodiment, the movie is downloaded. In another embodiment, the movie is streamed.

At step 1292, PC 5 plays the movie.

At step 1295, phone 6 terminates the call. At step 1300, voice system 30 receives the termination. At step 1305, voice system 30 sends a message to MITM server 50 including the unique ID and the content "hangup". At step 1310, MITM server 50 forwards the message to PC 5.

At step 1315, PC 5 receives a message with "hangup".

At step 1320, PC 5 stops playing the movie.

Another use of MITM server 50 will now be described.

Speech to text conversion requires specialized software that may not be available on all end user computing devices. In particular, device 7 is a mobile hand-held device, and reducing processor usage to conserve battery life is usually a goal for this type of device.

In this case, device 7 captures a spoken utterance from its user, and sends the utterance file and its unique ID to speech to text server 90 for conversion into text.

Server 90 receives the utterance file and unique ID, then checks with MITM server 50 to see if the ID is valid, because there is a cost for performing conversion that will be paid by the operator of server 90. That is, the operator wishes to provide the conversion service only to valid users of its multi-media experience. If the unique ID is valid, server 90 converts the speech to text and sends the text to device 7, shown in FIG. 1.

A third use case will now be described.

When a web advertiser wants create an email to the user, the user must be asked to type their email either into the ad unit or, if the ad unit opens an email client, in the "to:" field of the email client. However, the user may mistype the email address either accidentally (typographical error) or deliberately (creating spam). Asking the user to email the ad unit instance using MITM server 50 eliminates the possibility of spam or accidentally emailing another person. Receipt of an email can also be a condition of progressing through a video interaction. For example, a content provider with valuable video content may require an email address be entered before serving video. Without using MITM server 50, typically the user would type an email into the ad unit or an email client, send the email (to themselves), receive the email, open the email and click a link inside to progress/proceed. Using MITM server 50 eliminates one of the two steps of the conventional process, making the process significantly friendlier to a user.

A fourth use case will now be described.

A user prints a scannable (e.g., bar code) version of their ID. The user takes the printed ID to a geographical location with a web-connected computer—such as a museum, theme park, or a security-conscious location—and scans the printed ID to cause synchronized media experiences to occur on their computer or between screens at the location and on their computer.

A fifth use case will now be described.

Let it be assumed that a retail store has a "check your weight machine". A user, taking a device with them that has a web (http) browser, goes to the retail stores and sees the "check your weight" machine. The machine directs the user to stand on its weighing platform, and directs the user to navigate to a webpage on the user's device; the webpage has an embedded link to a script as described above. The webpage displays an ID. If the user types the ID into the weighing machine, then the weighing machine, by connecting to MITM server 50 and using the ID, can pass its weight data to the user's web device which, according to the script, may save the weight data or play video or perform another interaction that relates to the user's weight data.

Alternately, if the weighing machine is itself an http-connected device and uses MITM server 50, the numbers could be typed into the computer and passed to the weighing machine. That is, if the weighing machine uses http polling with MITM server 50, then the message flow can go in the opposite direction as the message flow direction described in the preceding paragraph.

This example illustrates verification of a real-world action, using the weight machine. The weighing machine is passing information to the user's computer that of course, the user could have typed in themselves. However, the fact that the data, even if only a two or three digits representing the weight, comes from the weighing machine, shows that the user used the weighing machine. If the machine was not passing the data to the browser, the user would be able to simply type in the data themselves when at home. The user's computer need not necessarily be with them at that moment, if the script had displayed the ID and the user had captured (written) the ID and visited the weighing machine shortly thereafter, the ID could still be used with the weighing machine.

This example further illustrates sending data approximately instantaneously. If the data was not simply a few digits representing weight, but instead, more information representing, for example, a fingerprint or a retina scan, it might be practically impossible for a human to manually enter the data to their device. However, MITM server 50 and a cooperating script make it easy to transmit such complicated information to the user nearly instantaneously and with 100% accuracy.

This example also illustrates secure transmission of information. By asking the user to type numbers into the weighing machine that were generated by the computer, and using an additional confirmation step, whereby the computer asks the user to type a second set of numbers into the weighing machine, confidential, security and non-tampered with data is virtually assured of being received from the weighing machine to the computer, or from the computer to the weighing machine. The user may or may not be aware of the underlying data/measurements that are being transferred back and forth.

This example is extended to illustrate convenience. Assume that the user completed a questionnaire prior to using the weighing machine and the questionnaire data affected the physical weighing process, such as by determining a weight deduction for clothing. The questionnaire can be completed under the rules of the script at a first location, and then the questionnaire data is retrieved at a second location—the location of the weighing machine—and processed by the weighing machine and the processed data is sent back to the user's computer with no chance of the user tampering with the processed data.

A sixth use case will now be described.

This use case illustrates password protection. A user associates his or her unique ID with an alphanumeric identification string, and stores this pairing in a database at data server 70. The combination of the unique ID and the alphanumeric identification string functions as a password. The user logs into a web browser (or device) using the unique. ID and the alphanumeric identification string which is verified by data server 70. Once verified, MITM server 50 registers the unique ID and passes messages as discussed above. Data security is higher in this instance because a longer and alphanumeric string of characters must be typed by the user.

This use case illustrates using MITM server 50 in a "user-registered" as opposed to "device-registered" way, i.e., a distinction is made between a person and an apparatus.

A seventh use case will now be described.

This use case illustrates convenience. A user associates his or her unique ID with an alphanumeric identification string, and stores this pairing in a database at data server 70. Thereafter and until a certain time has elapsed or other timeout event occurs, messages from devices/sources with stored alphanumeric addresses that are in the database can be associated with unique IDs and sent to MITM server 50. This enables certain devices/programs to send successive messages to MITM server 50 without having to reenter the unique ID with each and every message. For example, a cellphone would be able to register a telephone number as being associated with a unique ID and send successive SMS texts through MITM server 50 without reentering the unique ID each and every time, an instant messaging program such as AOL's AIM would be able to send successive IM texts through MITM server 50 without reentering the unique ID, or an email address could be associates with a unique ID such that successive mails from an address are sent to MITM server 50 with the corresponding unique ID from the database at data server 70.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A system for coordinating communications between a first device and a second device, the first and second devices being independent of each other and used by the same person, comprising:
   a first server for sending an address of a first script to the first device, the first device being associated with a network address;
   an intermediate server for:
   (a) receiving, from the first device executing the first script, the network address for the first device and a request for an ID,
   (b) sending the ID to the first device, the ID being other than a network address, and
   (c) placing the ID on a waiting list, the ID being associated with the network address of the first device;
   wherein the first script controls presentation of the ID to the person by the first device, and the person provides the ID to the second device without interaction between the first and second devices;
   a second server for executing a second script that controls communication with the second device to receive the ID from the second device, the second device being devoid of client software, the second script for sending a message, addressed to the ID provided from the second device, to the intermediate server; and wherein the intermediate server is also for:
   (d) receiving the message addressed to the ID from the second server, and
   (e) sending the message to the network address associated with the ID;

whereby the second server is able to send a message to the first device without knowledge of the network address of the first device so that an author of the second script can define an interaction with a user spanning the first and second devices without knowledge of the network address of the first device.

2. The system of claim 1, wherein the address of the first script is the address of the first server.

3. The system of claim 1, wherein the intermediate server is also for generating the ID.

4. The system of claim 1, wherein the intermediate server sends a confirmation code with the ID at step (b), and the intermediate server performs step (e) only if the first device provided the confirmation code to the intermediate server.

5. The system of claim 1, wherein the first device includes a display screen and the first script includes an instruction to present the ID on the display screen.

6. The system of claim 1, wherein the address of the first script is embedded in a web page sent from the first server to the first device.

7. The system of claim 1, wherein the intermediate server is also for receiving a poll from the first device, and for sending information to the first device in response to the poll.

8. The system of claim 7, wherein the intermediate server is also for setting a timer to define the duration of the response period to the poll, and for leaving the timer undisturbed when the information is sent.

9. The system of claim 1, wherein the intermediate server is also for receiving a next message addressed to the ID, and for sending the next message to the network address associated with the ID.

10. The system of claim 9, wherein the next message is received from a third device different than each of the first device, the second device, the first server and the second server.

11. A method of coordinating communications between a first device and a second device, the first and second devices being independent of each other and used by the same person, comprising:

sending an address of a first script from a first server to the first device;

receiving, at an intermediate server from the first device executing the first script, a network address for the first device and a request for an ID;

sending the ID, from the intermediate server to the first device, the ID being other than a network address, the first script controlling presentation of the ID to the person via the first device;

placing the ID on a waiting list at the intermediate server, the ID being associated with the network address of the first device;

receiving, at the intermediate server, a message addressed to the ID from a second server executing a second script, the second server having received the ID from the second device, the second device being devoid of client software, the ID having been provided to the second device by the person without interaction between the first and second devices, and sending the message, received from the second server, from the intermediate server to the network address associated with the ID;

whereby the second server is able to send a message to the first device without knowledge of the network address of the first device so that an author of the second script can define an interaction with a user spanning the first and second devices without knowledge of the network address of the first device.

12. The method of claim 11, wherein the address of the first script is the address of the first server.

13. The method of claim 11, wherein the intermediate server is also for generating the ID.

14. The method of claim 11, wherein the intermediate server sends a confirmation code with the ID at step (b), and the intermediate server performs step (e) only if the first device provided the confirmation code to the intermediate server.

15. The method of claim 11, wherein the first device includes a display screen and the first script includes an instruction to present the ID on the display screen.

16. The method of claim 11, wherein the address of the first script is embedded in a web page sent from the first server to the first device.

17. The method of claim 11, wherein the intermediate server is also for receiving a poll from the first device, and for sending information to the first device in response to the poll.

18. The method of claim 17, wherein the intermediate server is also for setting a timer to define the duration of the response period to the poll, and for leaving the timer undisturbed when the information is sent.

19. The method of claim 11, wherein the intermediate server is also for receiving a next message addressed to the ID, and for sending the next message to the network address associated with the ID.

20. The method of claim 19, wherein the next message is received from a third device different than each of the first device, the second device, the first server and the second server.

* * * * *